United States Patent Office 3,163,645
Patented Dec. 29, 1964

3,163,645
DERIVATIVES OF 3,4-DIHYDRO-2-H-[1,2,4]-BEN-ZOTHIADIAZINE-1,1-DIOXIDES
George de Stevens and Lincoln Harvey Werner, Summit, N.J., assignors to Ciba Corporation, New York, N.Y., a corporation of Delaware
No Drawing. Filed Sept. 25, 1964, Ser. No. 399,132
43 Claims. (Cl. 260—243)

This application is a continuation-in-part of our application Serial No. 764,482, filed September 29, 1958 (now abandoned), which is in turn a continuation-in-part of our application Serial No. 751,620, filed July 29, 1958 (now abandoned), which is in turn a continuation-in-part of our application Serial No. 740,582, filed June 9, 1958 (now abandoned), which is in turn a continuation-in-part of our application Serial No. 727,242, filed April 9, 1958 (now abandoned).

This application is also a continuation-in-part application of our application Serial No. 16,160, filed March 21, 1960, which is in turn a continuation-in-part of our application Serial No. 788,782, filed January 26, 1959, which is in turn a continuation-in-part of our application Serial No. 764,482, filed September 29, 1958 (now abandoned), which is in turn a continuation-in-part of our application Serial No. 751,620, filed July 29, 1958 (now abandoned), which is in turn a continuation-in-part of our application Serial No. 740,582, filed June 9, 1958 (now abandoned), which is in turn a continuation-in-part of our application Serial No. 727,242, filed April 9, 1958 (now abandoned).

This application is, in addition, a continuation-in-part of our application Serial No. 242,913, filed December 7, 1962, which is in turn a continuation-in-part of our application Serial No. 42,216, filed July 12, 1960 (now abandoned) *and* our application Serial No. 12,679, filed March 4, 1960 (now abandoned). Our application Serial No. 12,679, filed March 4, 1960, is in turn a continuation-in-part of our application Serial No. 855,275, filed November 25, 1959 (now abandoned), which is in turn a continuation-in-part of our application Serial No. 791,044, filed February 4, 1959 (now abandoned), which is in turn a continuation-in-part of our application Serial No. 764,482, filed September 29, 1958 (now abandoned), which is in turn a continuation-in-part of our application Serial No. 751,620, filed July 29, 1958 (now abandoned), which is in turn a continuation-in-part of our application Serial No. 740,582, filed June 9, 1958 (now abandoned), which is in turn a continuation-in-part of our application Serial No. 727,242, filed April 9, 1958 (now abandoned).

This invention concerns 3,4-dihydro-2-H-[1,2,4]-benzothiadiazine-1,1-dioxides. More particularly, it relates to benzsulfamyl - 3,4 - dihydro - 2 - H - [1,2,4] - benzothiadiazine-1,1-dioxides, in which the nitrogen atom of the sulfamyl group may be unsubstituted or substituted. In addition to the sulfamyl group the carbocyclic portion contains the radical $R_3$ which stands for lower hydrocarbon, nitro, and particularly, halogen. The 3,4-dihydro-2-H-[1,2,4]-benzothiadiazine-1,1-dioxides of this invention include particularly the benz-N-$R_2'''$-sulfamyl-3-$R_1$-4 - $R_2''$ - 3,4 - dihydro - 2 - H - [1,2,4] - benzothiadiazine-1,1-dioxides, in which the carbocyclic portion contains the above-defined substituent $R_3$, and in which $R_1$ represents hydrogen, a hydrocarbon, a substituted hydrocarbon, a heterocyclic and a heterocyclic-lower alkyl radical, and each of the radicals $R_2''$ and $R_2'''$ stands for hydrogen, hydrocarbon or substituted hydrocarbon. These compounds may, therefore, be represented by the following formula

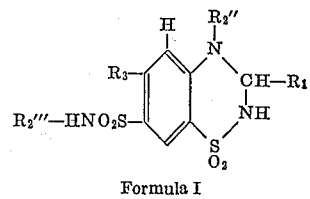

Formula I in which $R_1$ may represent hydrogen, or a hydrocarbon, a substituted hydrocarbon, a heterocyclic or a heterocyclic-lower hydrocarbon radical, each of the radicals $R_2''$ and $R_2'''$ may be hydrogen, hydrocarbon or substituted hydrocarbon and $R_3$ may stand for hydrocarbon nitro, and particularly, halogen. Acylated derivatives and alkali metal salts of such compounds are also included within the scope of this invention, as well as process for the manufacture of the above-described 3,4-dihydro-2-H-[1,2,4]-benzothiadiazine-1,1-dioxides.

Apart from being hydrogen, $R_1$ may also stand for hydrocarbon radicals, for example, lower aliphatic hydrocarbon, such as lower alkyl, e.g. methyl, ethyl, propyl, isopropyl, butyl, isobutyl, secondary butyl, tertiary butyl, pentyl, isopentyl, neopentyl, etc., lower alkenyl, e.g. vinyl or 1-propenyl, or lower alkinyl, e.g. ethinyl; carbocyclic aryl, such as monocyclic or bicyclic carbocyclic aryl, e.g. phenyl, 1-naphthyl or 2-naphthyl; or carbocyclic aryl-lower aliphatic hydrocarbon, such as carbocyclic aryl-alkyl, primarily monocyclic carbocyclic aryl-lower alkyl or bicyclic carbocyclic aryl-lower alkyl, e.g. benzyl, 2-phenyl-ethyl, naphthyl-1-methyl or naphthyl-2-methyl; or for heterocyclic radicals, particularly monocyclic heterocyclic radicals, such as furyl, e.g. 2-furyl; thienyl, e.g. 2-thienyl or pyridyl, e.g. 2- or 4-pyridyl; or bicyclic heterocyclic radicals, such as quinolyl or piperonyl; or monocyclic heterocyclic-lower alkyl radicals, such as, for example, thenyl, e.g. 2-thenyl. $R_1$ may also be an aliphatic carbocyclic hydrocarbon radical or an aliphatic carbocyclic hydrocarbon-lower aliphatic hydrocarbon radical. These radicals may contain additional substituents; aromatic or heterocyclic portions may be substituted by lower alkyl, e.g. methyl; hydroxyl; lower alkoxy, e.g. methoxy, ethoxy and the like, mercapto; lower alkylmercapto, e.g. methylmercapto, ethylmercapto and the like; sulfamyl; amino, particularly N,N,-di-lower alkylamino, e.g. dimethylamino; halogen, e.g. chlorine, fluorine or bromine; or halogeno-lower alkyl, e.g. trifluoromethyl and the like. Lower aliphatic hydrocarbon portions may contain hydroxy; lower alkoxy, e.g. methoxy or ethoxy; tertiary amino, e.g. dimethylamino or diethylamino; or halogen, e.g. chlorine or bromine and the like, as further substituents; $R_1$ may, therefore, be represented, for example, by chloromethyl, trichloromethyl, methoxy- or ethoxymethyl or similar substituents.

In the above compounds, more specifically in those compounds of Formula I, wherein $R_1$ is carbocyclic aryl-lower aliphatic hydrocarbon, particularly monocyclic carbocyclic-lower alkyl and especially phenyl-lower alky, in which lower alkyl preferably contains from one to four carbon atoms, the $R_1$ radical may be, inter alia, benzyl, 1-phenylethyl, 2-phenylethyl, 1-phenylpropyl, 2-phenylpropyl, 3-phenylpropyl, 1-methyl-2-phenylethyl and the like. These R₁ radicals may contain substituents in the carbocyclic aryl portion, such as, for example, lower alkyl, e.g. methyl, ethyl, n-propyl, isopropyl and the like, or functional groups, such as, for example, lower alkoxy, e.g. methoxy, ethoxy and the like, lower alkylene-dioxy, e.g. methylenedioxy, lower alkyl-mercapto, e.g. methylmercapto, ethylmercapto and the like, nitro, amino, particularly N,N-di-lower alkyl-amino, e.g. N,N-dimethyl-amino, halogeno, e.g. fluoro, chloro, bromo and the like, halogeno-lower alkyl, e.g. trifluoromethyl and the like. Substituted monocyclic carbocyclic aryl-lower alkyl radicals are particularly lower alkyl-substituted phenyl-lower akyl, in which lower alkyl contains from one to four carbon atoms, such as, for example, lower alkyl-substituted benzyl, e.g. 3-methyl-benzyl, 4-methyl-benzyl, 4-ethyl-benzyl and the like, lower alkyl-substituted 1-phenyl-ethyl, e.g. 1-(2-methyl-phenyl)-ethyl, 1-(3-methyl-phenyl)-ethyl and the like, or lower alkyl-substituted 2-phenyl-ethyl, e.g. 2-(4-methyl-phenyl)-ethyl and the like. Other phenyl-lower alkyl radicals substituted in the carbocyclic portion are lower alkoxy-substituted phenyl-lower alkyl, lower alkylene-dioxy-substituted phenyl-lower alkyl, lower alkyl-mercapto-substituted phenyl-lower alkyl, nitro-substituted phenyl-lower alkyl, N,N-di-lower alkyl-amino, substituted phenyl-lower alkyl, halogeno-substituted phenyl-lower alkyl, halogeno-lower alkyl-substituted phenyl-lower alkyl, such as, for example, lower alkoxy-substituted benzyl, e.g. 2-methoxy-benzyl, 4-methoxy-benzyl, 3,4-dimethoxy-benzyl, 3,4,5-trimethoxy-benzyl and the like, lower alkylene-dioxy-substituted benzyl, e.g. 3,4-methylenedioxy-benzyl and the like, lower alkylmercapto-substituted benzyl, e.g. 4-methylmercapto-benzyl and the like, nitro-substituted benzyl, e.g. 3-nitrobenzyl, 4-nitrobenzyl and the like, N,N-di-lower alkyl-amino-substituted benzyl, e.g. 3-N,N-dimethylamino-benzyl, 4-N,N-dimethylamino-benzyl and the like, halogeno-substituted benzyl, e.g. 3-fluorobenzyl, 4-chloro-benzyl, 4-bromobenzyl, 3,4-dichloro-benzyl, 2,5-dibromobenzyl and the like, halogeno-lower alkyl-substituted 1-phenylethyl, e.g. 1-(4-trifluoromethyl-phenyl)-ethyl and the like, 1-(lower alkoxy-substituted phenyl)-ethyl, e.g. 1-(4-methoxy-phenyl)-ethyl, 1-(3-ethoxy-phenyl)-ethyl and the like, 1-(lower alkylene-dioxy-substituted phenyl)-ethyl, e.g. 1-(3,4-methylenedioxy-phenyl)-ethyl and the like, 1-(lower alkyl-substituted phenyl)-ethyl, e.g. 1-(4-trifluorometh-yl mercapto-phenyl)-ethyl and the like, 1-(nitro-substituted phenyl)-ethyl, e.g. 1-(4-nitro-phenyl)-ethyl and the like, 1-(N,N-di-lower alkyl-amino-substituted phenyl)-ethyl, e.g. 1-(3-N,N-dimethylamino-phenyl)-ethyl and like, 1-(halogeno-substituted phenyl)-ethyl, e.g. 1-(4-chloro-phenyl)-ethyl, 1-(2,5-di-chloro-phenyl)-ethyl, 1-(3-bromo-phenyl)-ethyl and the like, 1-(halogeno-lower alkyl-substituted phenyl)-ethyl, e.g. 1-(4-tri-fluoromethyl)-ethyl and the like; 2-(lower alkoxy-substituted phenyl)-ethyl, e.g. 2-(2-methoxy-phenyl)-ethyl, 2-(4-methoxy-phenyl)-ethyl, 2-(3,4-dimethoxy-phenyl)-ethyl, 2-(3,4,5-trimethoxy-phenyl)-ethyl and the like, 2-(lower alkylene-dioxy-substituted phenyl)-ethyl, e.g. 2-(3,4-methylenedioxy-phenyl)-ethyl, 2-(lower alkylmercapto-substituted phenyl)-ethyl, e.g. 2-(4-methylmercapto-phenyl)-ethyl and the like, 2-(nitro-substituted phenyl)-ethyl, e.g. 2-(3-nitro-phenyl)-ethyl, 2-(4-nitro-phenyl)-ethyl and the like, 2-(N,N-di-lower alkyl-amino-substituted phenyl)-ethyl, e.g. 2-(3-N,N-dimethylamino-phenyl)-ethyl, 2-(4-N,N-dimethylamino-phenyl)-ethyl and the like, 2-(halogeno-substituted phenyl)-ethyl, e.g. 2-(3-fluoro-phenyl)-ethyl, 2-(4-chloro-phenyl)-ethyl, 2-(4-bromo-phenyl)-ethyl, 2-(3,4-dichloro-phenyl)-ethyl, 2-(2,5-dibromo-phenyl)-ethyl and the like, or any other aryl-substituted phenyl-lower alkyl radical.

More specifically, in those compounds of Formula I, wherein R₁ is an aliphatic carbocyclic hydrocarbon radical, the R₁ radical is one in which the aliphatic carbocyclic (alicyclic) portion may be saturated or may contain one or more than one double bond depending on the number of ring carbon atoms. Cycloalkyl may contain from three to eight, especially from five to six, and cycloalkenyl from four to eight, particularly from five to six, ring carbon atoms. Cycloalkyl may be represented by cyclopropyl, cyclobutyl, cyclopentyl, cyclohexyl, cycloheptyl and cyclooctyl, whereas cycloalkenyl radicals may be, for example, 2-cyclobutenyl, 2-cyclopentenyl, 3-cyclopentenyl, 2-cyclohexenyl, 3-cyclohexenyl, 3-cycloheptenyl, 2-cyclo-octenyl and the like.

Aliphatic carbocyclic hydrocarbon-lower aliphatic hydrocarbon radicals are primarily carbocyclic aliphatic hydrocarbon-lower alkyl radicals, in which the aliphatic carbocyclic (alicyclic) portion may be saturated or contain one or more than one double bond depending on the number of ring carbon atoms, which may be from three to eight, and in which lower alkyl is represented by a lower alkylene radical containing from one to seven, such as from one to four, especially from one to two, carbon atoms, e.g. methylene, 1,1-ethylene, 1,2-ethylene, as well as 1,1-propylene, 1,2-propylene, 2,2-propylene, 1,3-propylene, 1,4-butylene and the like.

Such radicals are particularly cycloalkyl-lower alkyl radicals, in which cycloalkyl contains from three to eight, especially from five to six, ring carbon atoms and lower alkyl contains from one to four carbon atoms, especially cycloalkylmethyl, in which cycloalkyl contains from three to eight, primarily from five to six, ring carbon atoms, e.g. cyclopropylmethyl, cyclobutylmethyl, cyclopentylmethyl, cyclohexylmethyl, cycloheptylmethyl, cyclooctylmethyl and the like, 1-cycloalkylethyl, in which cycoalkyl contains from three to eight, particularly from five to six, ring carbon atoms, e.g. 1-cyclopropylethyl, 1-cyclobutylethyl, 1-cyclopentylethyl, 1-cyclohexylethyl, 1-cycloheptylethyl and the like, or 2-cycloalkyl-ethyl, in which cycloalkyl contains from three to eight, particularly from five to six, ring carbon atoms, e.g. 2-cyclopropylethyl, 2-cyclopentylethyl, 2-cyclohexylethyl, 2-cycloheptylethyl and the like, as well as other cycloalkyl-lower alkyl radicals, in which cycloalkyl contains from three to eight, particularly from five to six, ring carbon atoms and lower alkyl contains from three to four carbon atoms, e.g. 1-cyclopentylpropyl, 2-cyclopentylpropyl, 3-cyclopentylpropyl, 4-cyclopentylbutyl, 1-cyclohexylpropyl, 2-cyclohexylpropyl, 3-cyclohexylpropyl, 4-cyclohexylbutyl and the like.

Cycloalkenyl-lower alkyl radicals, in which cycloalkenyl contains from four to eight, especially from five to six, ring carbon atoms and lower alkyl contains from one to four carbon atoms, are primarily cycloalkenyl-methyl, in which cycloalkenyl contains from four to eight, particularly from five to six, ring carbon atoms, e.g. 2-cyclopentenylmethyl, 3-cyclopentenylmethyl, 2-cyclohexenylmethyl, 3-cyclohexenylmethyl and the like, 1-cycloalkenyl-ethyl, in which cycloalkenyl contains from four to eight, particularly from five to six, ring carbon atoms, e.g. 1-(2-cyclopentenyl)-ethyl, 1-(3-cyclopentenyl) - ethyl, 1 - (2 - cyclohexenyl) - ethyl, 1 - (3 - cyclohexenyl)-ethyl and the like, or 2-cycloalkenyl-ethyl, in which cycloalkenyl contains from four to eight, particularly from five to six, carbon atoms, e.g. 2-(2-cyclopentenyl) - ethyl, 2 - (3 - cyclopentenyl) - ethyl, 2 - (2 - cyclohexenyl)-ethyl, 2-(3-cyclohexenyl)-ethyl and the like, as well as other cycloalkenyl-lower alkyl, in which cycloalkenyl contains from four to eight, especially from five to six, ring carbon atoms and lower alkyl contains from three to four carbon atoms, e.g. 1-(2-cyclopentenyl)-propyl, 1-(3-cyclopentenyl)-propyl, 2-(2-cyclopentenyl)-propyl, 2-(3-cyclopentenyl)-propyl, 3-(3-cyclopentenyl)-propyl, 4-(3-cyclopentenyl)-butyl, 1-(2-cyclohexenyl)-propyl, 1-(3-cyclohexenyl)-propyl, 2-(3-cyclohexenyl)-propyl, 3-(cyclohexenyl)-propyl, 4-(3-cyclohexenyl)-butyl and the like.

The above-mentioned carbocyclic alicyclic hydrocarbon radicals are preferably unsubstituted; substituents are, for example, lower alkyl, e.g. methyl, ethyl and the like, hydroxyl, etherified hydroxyl, such as lower alkoxy, e.g. methoxy, ethoxy and the like, esterified hydroxyl, such as lower alkoxycarbonyloxy, e.g. methoxycarbonyloxy, ethoxycarbonyloxy and the like, lower alkanoyloxy, e.g. acetoxy, propionoxy and the like, or halogeno, e.g. fluoro, chloro, bromo and the like, etherified mercapto, such as lower alkyl-mercapto, e.g. methylmercapto, ethylmercapto and the like, or amino, such as unsubstituted amino, N-monosubstituted amino, for example, N-lower alkyl-amino, e.g. N-methyl-amino, N-ethyl-amino and the like, or N,N-disubstituted amino, for example, N,N-di-lower alkyl-amino, e.g. N,N-dimethylamino, N,N-diethylamino, or N,N-lower alkylene-imino, e.g. 1-pyrrolidino, 1-piperidino and the like.

The radical $R_2'''$ represents primarily hydrogen, but may also stand for one of the substituents defined hereinbelow.

Aliphatic hydrocarbon and substituted aliphatic hydrocarbon radicals representing $R_2'''$ have the same meaning as the corresponding radicals representing the group $R_1$. More especially, $R_2'''$ stands for alkyl, particularly for lower alkyl containing from one to seven, primarily from one to four, carbon atoms, e.g. methyl, ethyl, n-propyl, isopropyl, n-butyl, isobutyl, secondary butyl and the like, as well as n-pentyl, isopentyl, n-hexyl and the like.

The radical $R_2'''$ also stands for alkenyl, primarily for lower alkenyl containing from two to seven, especially from three to five, carbon atoms. Such radicals are, for example, allylic lower alkenyl groups, e.g. prop-2-enyl (or allyl), 2-methyl-prop-2-enyl (or 2-methyl-allyl), but-2-enyl (or 3-methyl-allyl), pent-2-enyl (or 3-ethyl-allyl), 3-methyl-but-2-enyl (3,3-dimethyl-allyl) and the like, as well as vinyl, pent-3-enyl and the like.

Other aliphatic hydrocarbon radicals representing $R_2'''$ are, for example, lower alkynyl radicals, cycloaliphatic hydrocarbon radicals, cycloaliphatic hydrocarbon-lower aliphatic hydrocarbon radicals and the like, as well as aliphatic hydrocarbon radicals substituted by functional groups, such as hydroxy, etherified hydroxy, esterified hydroxy, etherified mercapto, carboxyl, amino, halogen, lower alkanoyl, carbocyclic aroyl and the like. Such radicals, as well as the functional groups attached to these aliphatic hydrocarbon radicals have been described in detail hereinabove.

The radical $R_2'''$ may also represent carbocyclic aryl-lower aliphatic hydrocarbon, particularly monocyclic carbocyclic-lower alkyl, in which lower alkyl contains preferably from one to four carbon atoms, e.g. benzyl, 1-phenylethyl, 2-phenylpropyl, 3-phenylpropyl, α,α-dimethyl-benzyl, 2-phenyl-isopropyl and the like, or these radicals containing substituents in the aromatic portion, such as lower alkyl, e.g. methyl, ethyl, propyl, isopropyl and the like, lower alkoxy, e.g. methoxy, ethoxy and the like, lower alkylenedioxy, e.g. methylenedioxy, lower alkyl-mercapto, e.g. methylmercapto, ethylmercapto and the like, nitro, amino, N,N-disubstituted amino, such as N,N-di-lower alkyl-amino, e.g. N,N-dimethylamino and the like, halogen, e.g. fluorine, chlorine, bromine and the like, or halogeno-lower alkyl, e.g. trifluoromethyl and the like. Such substituted monocyclic carbocyclic aryl-lower alkyl radicals are, for example, substituted benzyl radicals, such as lower alkyl-substituted benzyl, e.g. 3-methyl-benzyl, 4-methyl-benzyl and the like, lower alkoxy-substituted benzyl, e.g. 2-methoxy-benzyl, 4-methoxy-benzyl, 3,4-dimethoxy-benzyl, 3,4,5-trimethoxy-benzyl and the like, lower alkylenedioxy-substituted benzyl, e.g. 3,4-methylenedioxy-benzyl, lower alkyl-mercapto-substituted benzyl, e.g. 4-methylmercapto-benzyl and the like, nitro-substituted benzyl, e.g. 3-nitrobenzyl, 4-nitrobenzyl and the like, N,N-di-lower alkyl-amino-substituted benzyl, e.g. 3-N,N-dimethylamino-benzyl, 4-N,N-dimethylaminobenzyl and the like, halogeno-substituted benzyl, e.g. 3-fluorobenzyl, 4-chlorobenzyl, 4-bromobenzyl, 3,4-dichlorobenzyl, 2,5-dibromobenzyl and the like, or halogeno-lower alkyl-benzyl, e.g. 4-trifluoromethyl-benzyl and the like. Substituted 2-phenylethyl radicals are, for example, 2-(lower alkyl-substituted phenyl) - ethyl, e.g. 2 - (3 - methyl - phenyl) - ethyl, 2 - (4 - methyl - phenyl) - ethyl, 2 - (4 - isopropyl-phenyl)-ethyl and the like, 2-(lower alkoxy-substituted phenyl)-ethyl, e.g. 2-(2-methoxy-phenyl)-ethyl, 2-(4-methoxy-phenyl)-ethyl, 2-(3,4-dimethoxy-phenyl)-ethyl, 2-(3,4,5-trimethoxy-phenyl)-ethyl and the like, 2-(lower alkylenedioxy-substituted phenyl)-ethyl, e.g. 2-(3,4-methylenedioxy - phenyl) - ethyl, 2 - (lower alkylmercapto-substituted phenyl) - ethyl, e.g. 2 - (4 - methylmercapto-phenyl)-ethyl and the like, 2-(nitro-substituted phenyl)-ethyl, e.g. 2-(3-nitro-phenyl)-ethyl, 2-(4-nitro-phenyl)-ethyl and the like, 2-(N,N-di-lower alkyl-amino-substituted phenyl) - ethyl, e.g. 2 - (3 - N,N - dimethylamino-phenyl)-ethyl, 2-(4-N,N-dimethylamino-phenyl)-ethyl and the like, or 2-(halogeno-substituted phenyl)-ethyl, e.g. 2-(3-fluoro-phenyl)-ethyl, 2-(4-chloro-phenyl)-ethyl, 2-(4-bromo-phenyl)-ethyl, 2-(3,4-dichloro-phenyl)-ethyl, 2-(2,5-dibromo-phenyl)-ethyl and the like. In other monocyclic carbocyclic aryl-lower alkyl radicals, such as those mentioned hereinbefore, the aromatic portion may be substituted with the above-mentioned substituents; 1-(4-chloro - phenyl) - ethyl, 1 - (3,4,5 - trimethoxy - phenyl)-ethyl, 2 - (3 - methyl - phenyl) - propyl, 3 - (3,4 - dimethoxy - phenyl) - propyl, 2 - (3,4 - dichloro - phenyl)-isopropyl, 1-(3-fluoro-phenyl)-isopropyl and the like illustrate such substituted groups.

The radical $R_2'''$ may also stand for bicyclic carbocyclic aryl-lower alkyl radicals, such as 1-naphthylmethyl, 2-naphthylmethyl, 2-(1-naphthyl)-ethyl, 2-(2-naphthyl)-ethyl and the like, as well as these radicals substituted by the previously-mentioned substituents present in monocyclic carbocyclic aryl-lower alkyl radicals.

Also included as $R_2'''$ radicals are monocyclic or bicyclic carbocyclic aryl-lower alkenyl radicals, e.g. 3-phenyl-prop-2-enyl, 4-phenyl-but-2-enyl, 3-(2-naphthyl)-prop-2-enyl and the like, as well as such radicals substituted in the carbocyclic portion by substituents, such as those present in the monocyclic carbocyclic aryl-lower alkyl radicals.

The radical $R_2''$, attached to the second, aniline-type amino group of the 1,2,4-thiadiazine portion of the compounds of this invention (see Formula I), represents primarily hydrogen, but may also stand for lower alkyl, e.g. methyl, ethyl and the like.

The radical $R_3$ stands primarily for halogen, e.g. fluorine, bromine, iodine or, particularly, chlorine. In addition, it may especially represent a hydrocarbon radical, such as lower aliphatic hydrocarbon, for example, lower alkyl, e.g. methyl or ethyl, or a nitro group.

Acylated derivatives are those containing acyl radicals of organic carboxylic acids, particularly of lower aliphatic acids, such as, for example, carbonic acids, e.g., ethyl hydrogen carbonate, or lower alkanoic acids, e.g. acetic or propionic acid. Other organic carboxylic acids are, for example, carbocyclic aryl carboxylic acids, particularly monocyclic carbocyclic aryl carboxylic acids, e.g. benzoic or substituted benzoic acids; or monocyclic carbocyclic aryl-lower alkanoic acids, e.g. phenylacetic acid. Mono- or poly-acylated products may be formed.

Salts of the new compounds of this invention are therapeutically useful salts with metals, particularly the alkali metal salts, such as those with sodium or potassium. Mono- or poly-salts may be formed.

The new 3,4-dihydro-2-H-[1,2,4]-benzothiadiazine-1,1-dioxides of this invention show diuretic and natriuretic effects and are, therefore, useful to relieve excessive water and/or salt retention, for example, in connection with heart or kidney diseases. They also yield antihypertensive effects, and are, therefore, useful for the relief of hypertension, e.g. in cases of renal hypertension and the like. Generally, valuable diuretic, natriuretic and antihypertensive effects can be obtained with 6-R₃-7-sulfamyl-3,4-dihydro-2-H-[1,2,4]-benzothiadiazine-1,1 - dioxides, in which R₃ stands for halogen, e.g. fluorine, bromine or particularly chlorine, lower alkyl, e.g. methyl or nitro, and in which the sulfamyl group may be otherwise unsubstituted or contain as further substituents lower alkyl radicals, e.g. methyl.

Particularly pronounced diuretic, natriuretic and antihypertensive activities are found in the 3,4-dihydro-2-H-[1,2,4]-benzothiadiazine-1,1-dioxides of the formula

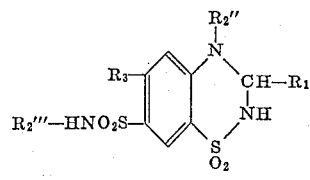

Formula II in which R₁ stands for hydrogen, lower alkyl, halogeno-lower alkyl, monocyclic carbocyclic aryl, monocyclic carbocyclic aryl-lower alkyl, aliphatic carbocyclic hydrocarbon or aliphatic carbocyclic hydrocarbon-lower alkyl, e.g. methyl, and R₃ stand for halogen, e.g. bromine, or particularly, chlorine, lower alkyl, e.g. methyl, or nitro. Representing this group of compounds are the 3,4-dihydro-2-H[1,2,4]-benzothiadiazine-1,1-dioxides of the formulae

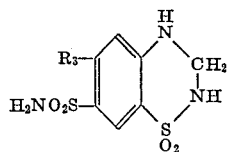

Formula III in which R₃ stands for halogen, particularly chlorine,

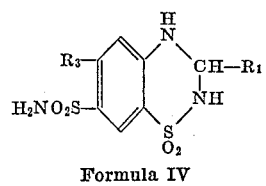

Formula IV in which R₁ stands for lower alkyl, and R₃ represents halogen, particularly chlorine,

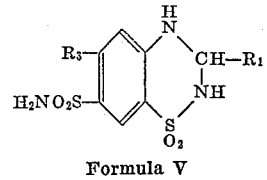

Formula V in which R₁ stands for halogeno-lower alkyl, and R₃ represents halogen, particularly chlorine, and

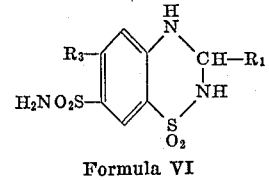

Formula VI in which R₁ stands for monocyclic carbocyclic aryl-lower alkyl, and R₃ stands for halogen, especially for chlorine, and those derivatives of these compounds, in which nitrogen atom R''' is substituted by lower alkyl, particularly methyl, as indicated in Formula II. Acylated 1,2,4-benzothiadiazine-1,1-derivatives are particularly those acylated with acyl radicals of carbonic acids, e.g. ethyl hydrogen carbonate, or lower alkanoic acids, e.g. acetic acid.

Further, as to compounds of the type shown in Formula VI, particularly outstanding diuretic, saliuretic and antihypertensive properties are exhibited by the series of 3,4-dihydro-2-H-[1,2,4]-benzothiadiazine-1,1-dioxides of the formula

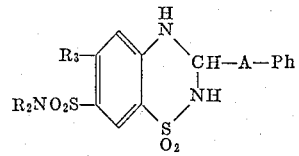

Formula VII in which A represents lower alkylene containing from one to four, preferably from one to two, carbon atoms, Ph stands for phenyl, lower alkyl-substituted phenyl, in which lower alkyl contains from one to four carbon atoms, e.g. 4-methylphenyl, 3-methylphenyl, 4-isopropylphenyl and the like, lower alkoxy-substituted phenyl, in which lower alkoxy contains from one to four carbon atoms, e.g. 4-methoxy-phenyl, 4-ethoxy-phenyl, 3,4-dimethoxy-phenyl and the like, or halogeno-substituted phenyl, in which halogeno has an atomic weight below 80, e.g. 4-fluorophenyl, 4-chlorophenyl, 2,5-dichlorophenyl, 4-bromophenyl and the like, and R₃ stands for halogeno, e.g. fluoro, chloro, bromo and the like, or lower alkyl, e.g. methyl, ethyl and the like, or nitro, or the therapeutically acceptable alkali metal, e.g. sodium and the like, salts thereof.

This group may be represented by 3-benzyl-6-halogeno-7-sulfamyl-3,4-dihydro - 2 - H - [1,2,4]-benzothiadiazine-1,1-dioxides, in which halogeno represents primarily chloro, as well as bromo and the like.

An additional group of compounds of this series, which shows exceptionally good diuretic and natriuretic properties with a negligible degree of side effects, e.g. potassium excretion, and low toxicity are the compounds of the formula

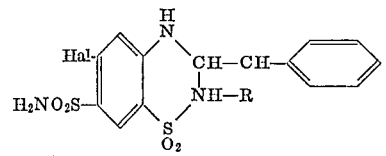

Formula VIII in which formula R represents lower alkyl, particularly methyl, as well as ethyl, n-propyl, isopropyl and the like, and Hal stands for halogeno, especially for chloro, as well as bromo and the like, or the therapeutically acceptable alkali metal, e.g. sodium and the like, salts thereof. This group may be represented by the 6-halogeno-3-(1-phenylethyl)-7-sulfamyl - 3,4 - dihydro-2-H-[1,2,4]-benzothiodiazine-1,1-dioxides, in which halogeno represents primarily chloro, as well as bromo and the like, and by 6-halogeno-3 - (1-phenylpropyl)-7-sulfamyl-3,4-dihydro-2-H-[1,2,4]-benzothiadiazine-1,1-dioxides, in which halogeno represents primarily chloro and the like.

A further group of highly active diuretic and saliuretic compounds are the 6-halogeno-3-(2-phenylethyl)-7-sulfamyl - 3,4 - dihydro-2-H-[1,2,4]-benzothiadizine-1,1-dioxides, in which halogeno represents primarily chloro, as well as bromo and the like.

Another series of compounds, particularly useful as diuretic and natriuretic agents are the compounds of the formula

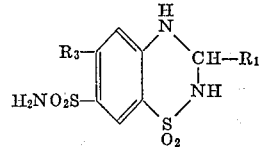

Formula IX in which R₁ represents cycloalkyl containing from three to eight, particularly from five to six, ring carbon atoms, and R₃ stands for halogeno, or the alkali metal salts of such compounds. This group may be represented by the compounds of the formula

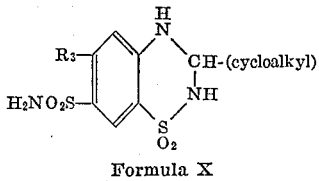

Formula X in which cycloalkyl contains from five to six ring carbon atoms and R₃ stands for chloro.

An additional group of highly active compounds are those of the formula

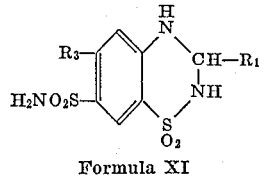

Formula XI in which R₁ represents cycloalkenyl, containing from four to eight, particularly from five to six, ring carbon atoms, and R₃ stands for halogeno, or the alkali metal salts of such compounds. This group may be represented by the compounds of the formula

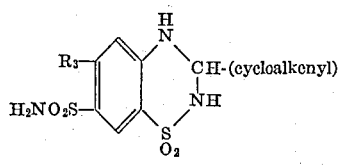

Formula XII in which cycloalkenyl contains from five to six ring carbon atoms and R₃ represents chloro.

Another group of compounds exerting particularly useful diuretic and antihypertensive effects, coupled with improved properties, are the compounds of the formula

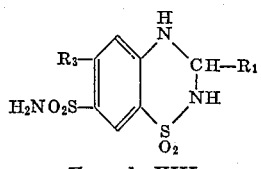

Formula XIII in which R₁ stands for cycloalkyl-lower alkyl, in which cycloalkyl contains from three to eight, particularly from five to six, ring carbon atoms, and lower alkyl contains from one to four, particularly from one to two, carbon atoms and R₃ represents halogeno, or the alkali metal salts of such compounds. This group may be represented by the compounds of the formulae

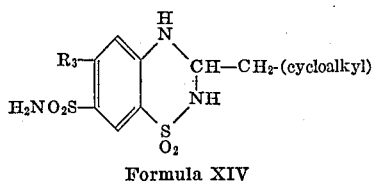

Formula XIV

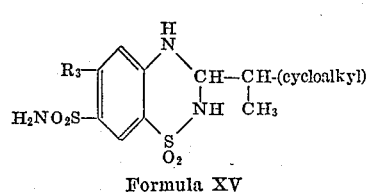

Formula XV

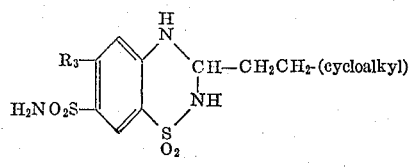

Formula XVI in which cycloalkyl contains from five to six ring carbon atoms and R₃ stands for chloro.

A further group of compounds showing useful diuretic and antihypertensive effects are the compounds of the formula

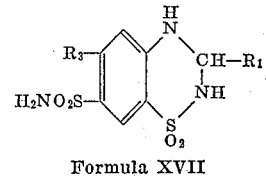

Formula XVII in which R₁ stands for cycloalkenyl-lower alkyl, in which cycloalkenyl contains from four to eight, primarily from five to six, ring carbon atoms, and lower alkyl contains from one to four, particularly from one to two, carbon atoms and R₃ represents halogeno, or the alkali metal salts of such compounds. This group may be illustrated by the compounds of the formulae

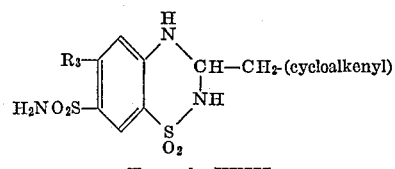

Formula XVIII

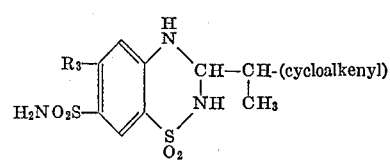

Formula XIX

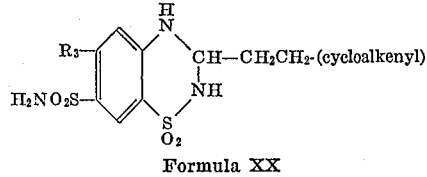

Formula XX in which cycloalkenyl contains from five to six ring carbon atoms and R₃ stands for chloro.

The new compounds of this invention may be used as medicaments in the form of pharmaceutical preparations, which contain the new 3,4-dihydro-2H-[1,2,4]-benzothiadiazine-1,1-dioxides or the salts thereof in admixture with a pharmaceutical organic or inorganic, solid or liquid carrier suitable for enteral, e.g. oral, or parenteral administration. For making up the preparations there can be employed substances which do not react with the new compounds, such as water, gelatine, lactose, starches, stearic acid, magnesium stearate, stearyl alcohol, talc, vegetable oils, benzyl alcohols, gums, waxes, propylene glycol, polyalkylene glycols or any other known carrier for medicaments. The pharmaceutical preparations may be in solid form, for example, as capsules, tablets or dragees, or in liquid form, for example, as solutions, suspensions or emulsions. If desired, they may contain auxiliary substances, such as preserving agents, stabilizing agents, wetting or emulsifying agents, salts for varying the osmotic pressure or buffers. They may also contain, in combination, other therapeutically useful substances;

for example, hypotensive agents, such as Rauwolfia or Veratrum alkaloids, e.g. reserpine, rescinamine, deserpidine, germine or protoveratrine, synthetic hypotensive compounds, e.g. hydralazine, or ganglionic blockers, e.g. chlorisondamine.

The benz-sulfamyl-3,4-dihydro - 2 - H - [1,2,4]-benzothiadiazine-1,1-dioxides of this invention may be prepared by treating a benz-sulfamyl-2-sulfamyl-aniline compound with an aldehyde. For example, the benz-N-$R_2'''$-sulfamyl-3-$R_1$-4-$R_2''$-3,4-dihydro - 2-H - [1,2,4] - benzothiadiazine-1,1-dioxides, in which $R_1$, $R_2''$ and $R_2'''$ have the above-given meaning, and in which the carbocyclic portion contains $R_3$ of the above-given meaning as further substituent, the acylated derivatives and salts thereof, may be prepared by treating aniline compound of the formula

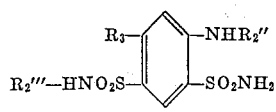

Formula XXI in which $R_2''$, $R_2'''$ and $R_3$ have the above-given meaning, or a salt thereof, with an aldehyde of the formula $R_1$CHO, in which $R_1$ has the above-given meaning, and/or, if desired, converting a resulting 3.4-dihydro-2-H[1,2,4]-benzothiadiazine-1,1-dioxide into its acylated derivative, and/or, if desired, converting a resulting salt into a free compound, and/or, if desired, converting a free compound into a salt thereof.

A salt of the aniline derivative used as the starting material may be a salt with an alkali metal or an acid addition salt. Preferably, the aldehyde is reacted with the aniline derivative in about stoichiometric amounts. The reaction may be performed in the absence of any condensing agent, or in the presence of a base, such as an alkali metal hydroxide, e.g. lithium hydroxide, sodium hydroxide, potassium hydroxide and the like, whereby the aldehyde is used in its reactive form. The reaction may also be carried out in the presence of a small amount of an acid, particularly a mineral acid, such as hydrohalic acid, e.g. hydrochloric or hydrobromic acid, or sulfuric acid, if desired, in anhydrous form, especially when the aldehyde is added to the reaction medium in a reactive derivative form, such as a form which yields the desired reactant in situ. Thus, for example, when formaldehyde is used as the reactant, it may be desirable to use it in the form of a polymer, such as paraformaldehyde or trioxane, or as an acetal, such as dimethoxymethane or diethoxymethane. Other aldehydes may be used as acetals, such as 1,1-dimethoxyethane or 1,1-diethoxyethane. In addition, the acetal of an aldehyde $R_1$—CHO may be an acetal with a lower alkanol, e.g. methanol, ethanol and the like, or one may use an alkali metal, e.g. sodium or potassium bisulfite addition compound advantageously in the presence of a mineral acid. Alkali metal bisulfite addition compounds are, for example, the sodium bisulfite addition compounds of cyclopentyl-acetaldehyde, 3-cyclopentyl-propionaldehyde and the like; reactive acetals are, for example, cyclopropane carboxaldehyde diethyl acetal (cyclopropyl-diethoxy-methane), cyclobutane carboxaldehyde diethyl acetal (cyclobutyl-diethoxy-methane), cyclopentane carboxaldehyde dimethyl acetal (cyclopentyl-dimethoxy-methane), cyclopentane carboxaldehyde diethyl acetal (cyclopentyl-diethoxy-methane), cyclohexane carboxaldehyde diethyl acetal (cyclohexyl-diethoxy-methane), cycloheptane carboxaldehyde (cycloheptyl-diethoxy-methane), cyclooctane carboxaldehyde diethyl acetal (cyclooctyl-diethoxy-methane), 3-cyclohexene carboxaldehyde diethyl acetal (3-cyclohexenyl-diethoxy-methane), cyclopentyl-acetaldehyde diethyl acetal (1-cyclopenthyl-2,2-diethoxy-ethane), cyclohexyl-acetaldehyde diethyl acetal (1-cyclohexyl-2,2-diethoxy-ethane), 2-(3-cyclohexenel)-acetaldehyde diethyl acetal (1-[3-cyclohexenyl]-2,2-diethoxy-ethane) and the like. Other acetals are, for example 1,1-dimethoxy-2-phenyl-ethane, 1,1-diethoxy-2-phenyl-ethane, 1,1-dimethoxy-2-phenyl-propane, 1,1-diethoxy-2-phenyl-propane, 1,1-dimethoxy-3-phenyl-propane, 1,1-diethoxy-3-phenyl-propane and the like.

The reaction may preferably be carried out in the absence or, preferably, in the presence of a solvent, for example, an ether, e.g. tetrahydrofuran, p-dioxane, diethyleneglycol dimethylether and the like, a lower alkanol, e.g. methanol, ethanol and the like, or a formamide, e.g. dimethylformamide and the like, a lower alkanone, e.g. acetone and the like, a mixture of such solvents, an aqueous mixture of such solvents or water, or any other suitable diluent. If desired, it may be completed at an elevated temperature, for example, by heating on a steam bath or at the boiling temperature of the solvent. If necessary, the reaction may be performed under increased pressure or in the atmosphere of an inert gas, e.g. nitrogen.

Illustrating this generally applicable process is the tratement of a 5-$R_3$-2-(sulfamyl)-4-(N-$R_2'''$-sulfamyl)-N-$R_2''$-aniline, in which $R_3$ represents halogen, lower alkyl or nitro, and each of the radicals $R_2''$ and $R_2'''$ represents hydrogen or lower alkyl, with an aldehyde of the formula $R_1$—CHO, in which $R_1$ represents hydrogen, lower alkyl, halogeno-lower alkyl, monocyclic carbocyclic aryl or monocyclic carbocyclic aryl-lower alkyl, in the presence of a small amount of a mineral acid, to form 3-$R_1$-4-$R_2''$-6 - $R_3$ - 7 - (N-$R_2'''$-sulfamyl) - 3,4 - dihydro - 2 - H - [1,2,4]-benzothiadiazine-1,1-dioxides, in which $R_1$, $R_2''$, $R_2'''$ and $R_3$ have the above-given preferred meaning. For example, the 6-chloro-7-sulfamyl-3,4-dihydro-2-H-[1,2,4]-benzothiadiazine-1,1-dioxide may be prepared by reacting 5-chloro-2,4-disulfamyl-aniline with an about equivalent amount of paraformaldehyde or aqueous formaldehyde in the presence of a small amount of hydrochloric acid.

The starting materials used in the above-described reactions are known or, if new, may be prepared according to procedures used for the manufacture of known compounds, for example, by treatment of an $R_3$-aniline, in which the amino group may be represented by $R_2''$NH—, and in which $R_2''$ and $R_3$ have the above-given meaning, with a halogeno-sulfonic acid, e.g. chlorosulfonic acid, and subsequently with ammonia, preferably in the form of aqueous ammonium hydroxide or liquid ammonia, or with a primary amine, for example, a lower aliphatic amine, such as, for example, a lower alkylamino, e.g. methylamine, ethylamine, propylamine or isopropylamine; a substituted lower aliphatic amine, such as, for example, a hydroxy-lower alkylamine, e.g. 2-hydroxy-ethylamine; monocyclic carbocyclic arylamines, e.g. an aniline, or monocyclic carbocyclic aryl-lower alkylamines, e.g. a benzylamine.

Whenever ammonia is used, the reaction may be carried out according to any of the known methods; liquid ammonia, gaseous ammonia or a solution of the reagent in water, in a lower alkanol, e.g. methanol, ethanol and the like, or in any other suitable solvent may be employed. Cooling or an elevated temperature and/or a closed vessel, may be necessary to obtain the desired result.

A second generally applicable method for the preparation of the benz-sulfamyl-3,4-dihydro-2-H-[1,2,4]-benzothiadiazine-1,1-dioxides of this invention comprises reducing in benz-sulfamyl-[1,2,4]-benzothiadiazine-1,1-dioxides, in which the 7-sulfamyl group may be unsubstituted or substituted, the C=N-double bond of the 1,2,4-thiadiazine-1,1-dioxide portion, and, if desired, carrying out the optional steps. Thus, the preparation of benz-N-$R_2'''$-sulfamyl-3-$R_1$-4-$R_2''$-3,4-dihydro-2 - H - [1,2,4]-benzothiadiazine-1,1-dioxides, in which $R_1$, $R_2''$ and $R_2'''$ have the above-given meaning and which contains $R_3$ of the above-given meaning as a further substituent in the carbocyclic portion, the acylated derivatives and salts thereof, comprises treating 1,2,4-benzothiadiazine compounds of the formulae

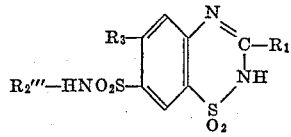

Formula XXII or

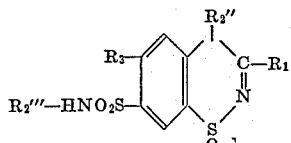

Formula XXIII in which $R_1$, $R_2''$, $R_2'''$ and $R_3$ have the above-given meaning, or salts thereof with a reagent capable of reducing the C=N-double bond of the 1,2,4-thiadiazine-1,1-dioxide portion, and, if desired, carrying out the optional steps.

The removal of the C=N-double bond may be achieved, for example, by treatment with a borohydride or an equivalent reducing agent capable of removing such double bond. The preferred reagents are alkali metal borohydrides, e.g. lithium borohydride, potassium borohydride or, particularly sodium borohydride. Other borohydrides are alkaline earth metal borohydrides, such as calcium or strontium borohydride; aluminum borohydride may be used as well, and sodium dimethoxy borohydride is another possible reducing reagent. If desired, these borohydrides may be used in the presence of an activating substance, such as, for example, aluminum chloride. The reaction may also be carried out in the presence of an alkaline reagent, such as an aqueous alkaline reagent, which may be diluted with other solvents, such as those mentioned hereinbelow; alkaline reagents are, for example, dilute aqueous solutions of alkali metal hydroxide, e.g. lithium, sodium or potassium hydroxide. If desired, organic solvents, such as ethers, e.g. 1,2-dimethoxyethane, diethyleneglycol dimethylether and the like, lower alkanols, e.g. methanol, ethanol, propanol, isopropanol and the like, or liquid carboxylic acid amides, such as formamides, e.g. formamide, N,N-dimethylformamide and the like, may be employed. The reduction is carried out at room temperature or at an elevated temperature, if necessary, in the atmosphere of an inert gas, such as nitrogen.

Catalytic reduction under certain conditions may also be used for the removal of the C=N-double bond. For example, treatment of the starting material, particularly a solution thereof, with hydrogen in the presence of a catalyst containing a metal of the eighth group of the Periodic System, and of an organic base, may cause the removal of the double bond. Suitable solvents are, for example, lower alkanols, e.g. methanol, ethanol and the like, ethers, e.g. diethyleneglycol dimethylether and the like, or other equivalent solvents. Metals of the eighth group of the Periodic System, present in the catalysts, may be, for example, palladium, platinum and the like; these metals may be supported by adsorbents, such as charcoal, aluminum oxide, silica gel and the like. Palladium on charcoal, platinum oxide and the like may serve as catalysts. An organic base is particularly a heterocyclic basic compound, particularly an N,N-alkyleneimine, e.g. pyrrolidine, piperidine and the like, or an N,N-aza-alkyleneimine, e.g. piperazine and the like, or any other suitable base. The hydrogenation may be carried out under atmospheric or under increased pressure, if necessary, while heating.

The electrolytic reduction procedure provides for another possibility of removing the C=N-double bond; such procedure is carried out according to standard methods. Generally, it is performed on a cathode of high overpotential and at a current density greater than about 0.02 amp./cm.² Cathodes with high overpotentials are, for example, those having an overpotential equal to or higher than cadmium, such as cadmium, zinc, mercury, lead amalgam or lead. Any appropriate anode, such as platinum, carbon, lead or stainless steel, and any appropriate anolyte, for example, dilute sulfuric acid or dilute hydrochloric acid, may be employed. A lead or a platinum anode and a dilute sulfuric acid anolyte are preferred.

A current density greater than about 0.02 amp./cm.² is sufficient to bring about the reduction of the C=N-double bond; however, for practical reasons a current density higher than about 0.25 amp./cm.² may diminish the efficiency of the process due to increased hydrogen evolution.

The reduction is performed in an aqueous acidic medium, such as, for example, an aqueous solution of a strong inorganic acid, which ionizes readily and does not decompose at the current density employed, such as, for example, sulfuric acid. In order to secure a complete solution of the starting material in additional solvent, such as, for example, a formamide, e.g. N,N-dimethylformamide and the like, may be added. Lower alkanols, e.g. methanol, ethanol and the like, may replace or may be added with a formamide to enhance the solubility of the starting material and the end product.

Diaphragms separating the anolyte and the catholyte are more especially ion exchange membranes, such as ion exchange resins (amberplex), alundum of parchment and the like.

Any groups, which may be affected by the hydrogenation procedure, may be protected or simultaneously converted into hydrogenated groups.

The starting materials used in this reaction are known, or, if new, may be obtained according to procedures used for the preparation of the known compounds.

A resulting 3,4 - dihydro-2-H-[1,2,4]-benzothiadiazine-1,1-dioxide may be acylated according to procedures used for the preparation of N-acyl derivatives. Thus, by treating a 3,4-dihydro-2-H-[1,2,4]-benzothiadiazine-1,1-dioxide with a reactive functional derivative of a carboxylic acid, such as a halide, e.g. chloride, or an anhydride, mono- or poly-acylated products may be obtained. The reaction may be carried out according to known conditions, for example, in the absence or presence of a condensing reagent, such as a liquid organic base, for example, a tri-lower alkyl-amine, e.g. triethylamine, or a pyridine derivative, e.g. pyridine or collidine, particularly if an anhydride, e.g. acetic acid anhydride, is used, or by using a metal salt, such as the silver salt or an alkali metal, e.g. sodium, salt of the 3,4-dihydro-2-H-[1,2,4]-benzothiadiazine-1,1-dioxide, for example, if an acid halide is used. Solvents are preferably anhydrous inert organic solvents, such as, for example, lower aliphatic ketones, e.g. acetone. Liquid basic condensation reagents, such as, for example, pyridine or collidine, may simultaneously serve as solvents. A liquid acylation reagent, such as, for example, acetic acid anhydride, may be used without an additional solvent. Depending on the conditions and/or the molar ratios, mono- or poly-acylated products may be obtained.

Depending on the conditions of the reaction, the resulting product may be obtained as the free compound or as a salt thereof. An alkali metal salt may be converted into the free compound by treatment with an aqueous acidic reagent, such as a mineral acid, for example, hydrohalic acid, e.g. hydrochloric acid, or sulfuric acid. A free compound may be converted into an alkali metal salt, for example, by treatment with an alkali metal hydroxide, e.g. sodium or potassium hydroxide, in a solvent, such as in a lower alkanol, e.g. methanol or ethanol, or in water and evaporating the solvent; or by reacting the free compound, for example, in an ether, e.g. p-dioxane or diethyleneglycol dimethylether, solution, with an alkali metal hydride or amide, e.g. sodium or potassium hydride or amide, and removing the solvent. Mono- or poly-salts may be obtained.

Any resulting racemate may be converted into the antipodes thereof according to the methods used for resolving racemates. The invention also comprises any modification of the general process wherein a compound obtainable as an intermediate at any stage of the process is used as starting material and the remaining step(s) of the process is (are) carried out, as well as any new intermediates.

The following examples illustrate the invention; they are not to be construed as being limitations thereon. Temperatures are given in degrees centigrade.

*Example 1*

A mixture of 2.9 g. of 5-chloro-2,4-disulfamyl-aniline in 15 ml. of anhydrous diethyleneglycol dimethylether, 0.5 ml. of an ethyl acetate solution containing 109.5 g. of hydrogen chloride per 1000 ml. and 0.33 g. (0.011 mol) of paraformaldehyde is heated to 80–90° and maintained at that temperature for 1 hour. The resulting mixture is cooled to room temperature and concentrated to one-third of its volume under reduced pressure, diluted with water, then allowed to crystallize. The product is filtered off and recrystallized from water, to yield the desired 6-chloro-7-sulfamyl-3,4-dihydro-2-H-[1,2,4]-benzothiadiazine - 1,1-dioxide, M.P. 266–268°; yield 1.4 g.

By replacing paraformaldehyde by 0.84 g. of 1,1-dimethoxy-methane and proceeding as above, the same compound is obtained.

*Example 2*

A mixture of 2.9 g. of 5-chloro-2,4-disulfamyl-aniline in 20 ml. of anhydrous diethyleneglycol dimethylether, 0.44 g. of acetaldehyde and 0.5 ml. of solution of hydrogen chloride in ethyl acetate (109.5 g. hydrogen chloride per 1000 ml.) is heated to 80–90° and maintained at this temperature for 1 hour. The reaction mixture is concentrated under reduced pressure; on addition of water, the product separates and is then recrystallized from ethanol or equeous ethanol to yield 1.2 g. of the desired 6-chloro-3 - methyl-7-sufamyl-3,4-dihydro-2-H-[1,2,4]-benzothiadiazine-1,1-dioxide, M.P. 258–260°.

The same product is obtained by replacing the acetaldehyde by 0.9 g. of 1,1-dimethoxyethane or by 1.2 g. of 1,1-diethoxyethane.

*Example 3*

The 6 - chloro - 3 - ethyl - 7 - sulfamyl-3,4-dihydro-2-H-[1,2,4] - benzothiadiazine-1,1-dioxide and 6-chloro-3-ethoxymethyl - 7 - sulfamyl - 3,4 - dihydro-2-H-[1,2,4]-benzothiadiazine-1,1-dioxide may be prepared by substituting, in Example 1, an equivalent amount of propionaldehyde or 2-ethoxyacetaldehyde, respectively, for the paraformaldehyde of the reference example and otherwise following the procedure recited therein.

*Example 4*

Following the procedure of Example 1, except that an equivalent amount of 5-bromo-2,4-disulfamyl-aniline is substituted for the 5-chloro-2,4-disulfamyl-aniline of the reference Example 1, one may obtain 6-bromo-7-sulfamyl-3,4-dihydro-2-H-[1,2,4]-benzothiadiazine-1,1-dioxide.

*Example 5*

A solution of 1.0 g. of 2-4-disulfamyl-5-fluoro-aniline, M.P. 233–236°, in 5 ml. of diethyleneglycol dimethylether is treated with 0.1 g. of paraformaldehyde and 0.2 ml. of a saturated solution of hydrogen chloride gas in ethyl acetate, and the reaction mixture is heated to 80–90° for one hour. After cooling, the solution is concentrated under reduced pressure, water is added, and the aqueous solution is further concentrated. The crystalline material is filtered off and recrystallized from water to give 0.5 g. of 6-fluoro-7-sulfamyl-3,4-dihydro-2 - H - [1,2,4] - benzothiadiazine-1,1-dioxide, M.P. 229–231°.

*Example 6*

To a solution of 5.8 g. of 5-chloro-2,4-disulfamyl-aniline in 30 ml. of diethyleneglycol dimethylether are added 2.2 g. of benzaldehyde and 1 ml. of a saturated solution of hydrogen chloride in ethyl acetate, and the reaction mixture is kept at 80–90° for one hour. After cooling, concentrating under reduced pressure and diluting with water an oil separates which crystallizes under trituration with ether. The resulting 6-chloro-3-phenyl-7-sulfamyl-3,4-dihydro-2-H-[1,2,4] - benzothiadiazine - 1,1-dioxide is recrystallized from aqueous ethanol, M.P. 246–249°; yield: 4.0 g.

By using 4-chloro-benzaldehyde or 3,4,5-trimethoxybenzaldehyde in lieu of benzaldehyde, the 3-(4-chlorophenyl)-6-chloro-7-sulfamyl-3,4-dihydro - 2 - H - [1,2,4]-benzothiadiazine-1,1-dioxide and the 3-(3,4,5-trimethoxyphenyl)-6-chloro-7-sulfamyl-3,4-dihydro - 2 - H - [1,2,4]-benzothiadiazine-1,1-dioxide, respectively, may be prepared.

*Example 7*

By reacting 2.9 g. of 5-chloro-2,4-disulfamyl-aniline in 15 ml. of diethyleneglycol dimethylether with 0.75 g. of isobutyraldehyde in the presence of 0.5 ml. of a saturated solution of hydrogen chloride in ethyl acetate at 80–90° the crystalline 6-chloro-3-isopropyl-7-sulfamyl-3,4-dihydro-2-H-[1,2,4]-benzothiadiazine-1,1-dioxide precipitates after about ten minutes. It is recrystallized from dimethylformamide by adding hot water to the solution, M.P. 304–306°; yield: 2.6 g.

*Example 8*

By reacting 0.75 g. of n-butyraldehyde with 2.9 g. of 5-chloro-2,4-disulfamyl-aniline according to the process of Example 7, the 6-chloro-3-n-propyl-7-sulfamyl-3,4-dihydro-2 - H - [1,2,4] - benzothiadiazine-1,1-dioxide can be obtained after heating to 80–90° for one hour, concentrating under reduced pressure and diluting with water. It is recrystallized from aqueous ethanol and melts at 254–256°; yield: 2.3 g.

*Example 9*

A mixture of 2.9 g. of 5-chloro-2,4-disulfamyl-aniline, 1.2 g. of 2-thiophene-carboxaldehyde and 0.5 ml. of a saturated solution of hydrogen chloride in ethyl acetate in 15 ml. of diethylene glycol dimethylether is reacted at 80–90° for one hour and then concentrated under reduced pressure. On addition of water an oil separates which crystallizes slowly. The 6 - chloro - 7 - sulfamyl - 3 - (2-thienyl)-3,4-dihydro-2-H - [1,2,4] - benzothiadiazine - 1,1-dioxide is recrystallized from ethanol, M.P. 222–225°; yield: 0.7 g.

By using the 2-thiophene-acetaldehyde instead of the thiophene-carboxaldehyde, the 3-(2-thenyl)-6-chloro-7-sulfamyl-3,4-dihydro-2-H-[1,2,4] - benzothiadiazine - 1,1-dioxide can be prepared according to the above-given procedure.

*Example 10*

To a solution of 5.8 g. of 5-chloro-2,4-disulfamyl-aniline in 30 ml. of diethyleneglycol dimethylether are added 2.2 g. of pyridine-4-aldehyde and 1.0 ml. of a saturated solution of hydrogen chloride in ethyl acetate. The mixture is allowed to stand at room temperature for one hour and is then heated to 80–95° for one additional hour. After concentrating under reduced pressure, the residue is diluted with water, the supernatant solution decanted and ethanol added to the oily precipitate. The 6-chloro-3-(4-pyridyl)-7-sulfamyl-3,4-dihydro-2 - H - [1,2,4] - benzothiadiazine-1,1-dioxide crystallizes slowly and melts above 310°; yield: 1.0 g.

*Example 11*

A solution of 5.4 g. of 2,4-disulfamyl-5-methyl-aniline in 40 ml. of diethyleneglycol dimethylether is treated with 0.6 g. of paraformaldehyde and 1.5 ml. of a concentrated solution of hydrogen chloride in ethyl acetate and held at 80–100° for one hour. A crystalline material precipitates after concentrating under reduced pressure and adding water. The 6-methyl-7-sulfamyl-3,4-dihydro-2-H-[1,2,4]-benzothiadiazine-1,1-dioxide is filtered off and recrystalized from a 1:1-mixture of dimethylformamide and water, M.P. 263–265°; yield: 3.2 g.

*Example 12*

A mixture of 2.9 g. of 5-chloro-2,4-disulfamyl-aniline, 1.0 g. of 2-furaldehyde, 0.5 ml. of a concentrated solution of hydrogen chloride in ethyl acetate and 15 ml. of diethyleneglycol dimethylether is heated to 80–90° for one hour, then concentrated under reduced pressure. Water is added to precipitate an oil which crystallizes upon trituration with aqueous ethanol. After recrystallization from aqueous ethanol the 6-chloro-3-(2-furyl)-7-sulfamyl-3,4-dihydro-2-H-[1,2,4]-benzothiadiazine-1,1-dioxide melts at 214–218°; yield: 0.5 g.

*Example 13*

To a solution of 2.9 g. of 5-chloro-2,4-disulfamyl-aniline in 15 ml. of diethyleneglycol dimethylether are added 0.9 g. of isovaleraldehyde and 0.5 ml. of a saturated solution of hydrogen chloride in ethyl acetate. The reaction mixture is heated for one hour to 80–90°, then concentrated under reduced pressure. An oily material precipitates on the addition of water, the water is decanted and ethanol added. The 6-chloro-3-isobutyl-7-sulfamyl-3,4-dihydro-2-H-[1,2,4]-benzothiadiazine-1,1-dioxide crystallizes, is filtered off and recrystallized from a mixture of dimethylformamide and water, M.P. 241–245°; yield: 1.1 g.

*Example 14*

A mixture of 2.9 g. of 5-chloro-2,4-disulfamyl-aniline, 1.53 g. of chloroacetaldehyde diethylacetal and 0.5 ml. of a saturated solution of hydrogen chloride in ethyl acetatein 15 ml. of diethyleneglycol dimethylether is heated to 80–90° for one hour and then concentrated under reduced pressure. Water and ether are added to the residue which crystallizes slowly. The 6-chloro-3-chloro-methyl-7-sulfamyl-3,4-dihydro-2-H-[1,2,4]-benzothiadiazine-1,1-dioxide is recrystallized from aqueous ethanol, M.P. 235° (with decomposition); yield: 2.0 g.

*Example 15*

0.75 g. of 6-chloro-7-sulfamyl-[1,2,4-benzothiadiazine-1,1-dioxide is dissolved in 10 ml. of water by adding 35 drops of a 2 N aqueous solution of sodium hydroxide. 0.2 g. of sodium borohydride is added; the reaction mixture is allowed to stand at room temperature for five hours, and is then filtered and adjusted to pH=7–7.5. A crystalline precipitate is formed, which is filtered off and recrystallized from water, M.P. 268–272°; yield: 0.5 g. The mixed melting point with a sample of the 6-chloro-7-sulfamyl-3,4-dihydro-2-H-[1,2,4]-benzothiadiazine-1,1-dioxide obtained according to the process of Example 1 shows no depression and the infrared absorption spectra of the two products are identical.

*Example 16*

A mixture of 2.9 g. of 5-chloro-2,4-disulfamyl-aniline, 15 ml. of diethyleneglycol dimethylether, 1.1 g. of n-valeraldehyde and 0.5 ml. of a saturated solution of hydrogen chloride in anhydrous ethyl acetate is heated to 80–90° for two hours. The reaction mixture is concentrated under reduced pressure, water is added to the residue and then decanted from the oily precipitate. Upon addition of ethanol and standing at room temperature some unreacted 5-chloro-2,4-disulfamyl-aniline separates; the filtrate is then evaporated to dryness. The residue is treated with benzene and then with aqueous ethanol to yield 1.3 g. of 3-n-butyl-6-chloro-7-sulfamyl-3,4-dihydro-2-H-[1,2,4]-benzothiadiazine-1,1-dioxide, which after recrystallization from aqueous ethanol melts at 176–179°.

*Example 17*

A mixture of 1.0 g. of 5-chloro-2,4-disulfamyl-N-methylaniline, 10 ml. of diethyleneglycol dimethylether, 0.09 g. of paraformaldehyde and 0.25 ml. of a saturated solution of hydrogen chloride in anhydrous ethyl acetate is heated to 80–100° for one hour. After cooling the reaction mixture is concentrated under reduced pressure, water is added to the residue and the resulting crystalline 6-chloro-4-methyl-7-sulfamyl-3,4-dihydro-2-H-[1,2,4]-benzothiadiazine-1,1-dioxide is recrystallized from aqueous ethanol, M.P' 262–264°; yield: 0.5 g.

*Example 18*

To a refluxing solution of 2 g. of 5-chloro-2,4-disulfamyl-aniline in 50 ml. of p-dioxane is slowly added 0.912 g. of chloroacetyl chloride and the temperature is maintained for an additional three hours. After chilling and adding water, a crystalline material separates and is filtered off. The resulting product is dissolved by heating in dioxane and the solution which is formed is then concentrated by evaporation of some dioxane. The dioxane complex which forms is then separated and heated with boiling water to yield the desired 6-chloro-7-sulfamyl-3,4-dihydro-2-H-[1,2,4]-benzothiadiazine-1,1-dioxide, M.P. 264–265° C.

The sodium salt may be prepared by evaporating the solution of 6-chloro-7-sulfamyl-3,4-dihydro-2-H-[1,2,4]-benzothiadiazine-1,1-dioxide in an equimolar amount of aqueous sodium hydroxide.

*Example 19*

A mixture of 2.9 g. of 5-chloro-2,4-disulfamyl-aniline in 15 ml. of diethyleneglycol dimethylether, 0.8 ml. of a 37% aqueous solution of formaldehyde (0.3 g. of formaldehyde) and 0.5 ml. of a saturated solution of hydrogen chloride in ethyl acetate is heated for one hour to 80–90°. After concentration under reduced pressure and addition of water the 6-chloro-7-sulfamyl-2-H-[1,2,4]-benzothiadiazine-1,1-dioxide crystallizes and is recrystallized from water, M.P. 271–275°; yield: 1.1 g.

*Example 20*

To a solution of 2.9 g. of 5-chloro-2,4-disulfamyl-aniline in 15 ml. of diethylene glycol dimethylether are added 1.2 g. of phenylacetaldehyde and 0.5 ml. of a saturated solution of hydrogen chloride in anhydrous ethyl acetate. The reaction mixture is heated to 90–100° for two hours and then concentrated under reduced pressure. Water is added; a syrupy material precipitates, whereupon the water is decanted and, on addition of ethanol to the residue, the 3-benzyl-6-chloro-7-sulfamyl-3,4-dihydro-2-H-[1,2,4]-benzothiadiazine-1,1-dioxide precipitates. It is recrystallized from a mixture of dimethylformamide and water, M.P. 247–250°; yield: 0.6 g.

By using 3-chloro-phenylacetaldehyde, 3,4,5-trimethoxyphenylacetaldehyde, 3-methyl-phenylacetaldehyde, or lower alkyl, e.g. dimethyl or diethyl acetals thereof in place of the phenylacetaldehyde in the above procedure the 6-chloro-3-(3-chlorobenzyl)-7-sulfamyl-3,4-dihydro-2-H-[1,2,4]-benzothiadiazine-1.1-dioxide, 6-chloro-7-sulfamyl-3-(3,4,5-trimthoxy-benzyl)-3,4-dihydro-2-H-[1,2,4]-benzothiadiazine-1,1-dioxide or 6-chloro-3-(3-methyl-benzyl)-7-sulfamyl-3,4-dihydro-2-H-[1,2,4]-benzothiadiazine-1,1-dioxide, respectively, may be obtained.

*Example 21*

A solution of 5-chloro-2,4-disulfamyl-aniline in 30 ml. of diethyleneglycol dimethylether is treated with 1 ml. of a saturated solution of hydrogen chloride in ethyl acetate and 2.68 g. of 3-phenyl-propionaldehyde. The reaction mixture is heated to 70–90° for one hour, then concentrated under reduced pressure to a small volume, and 30 ml. of water is added. The 6-chloro-3-(2-phenyl-ethyl)-7-sulfamyl-3,4-dihydro-2-H-[1,2,4] - benzothiadiazine-1,1-dioxide crystallizes, is filtered off, recrystallized from ethanol (M.P. 117–119°; probably crystallizes with ethanol) and dried at 80°, M.P. 174–175°.

The following compounds can be prepared by varying in the previously-described methods the starting materials and proceeding according to the given procedures: 6-fluoro-3-(2-phenylethyl) - 7 - sulfamyl-3,4-dihydro-2-H-[1,2,4]-benzothiadiazine-1,1-dioxide, 6-bromo - 3 - (2-phenylethyl)-7-sulfamyl - 3,4 - dihydro-2-H-[1,2,4]-benzothiadiazine-1,1-dioxide, 6 - methyl-3(2-phenylethyl)-7-sulfamyl-3,4-dihydro-2-H-[1,2,4]-benzothiadiazine - 1,1-dioxide, 6-chloro-3-[2-(4-methyl-phenyl)-ethyl] - 7 - sulfamyl-3,-4-dihydro-2-H-[1,2,4]-benzothiadiazine - 1,1-dioxide, 6-chloro-3-[2-(4-methoxy-phenyl)-ethyl] - 7 - sulfamyl-3,4-dihydro-2-H-[1,2,4]-benzenothiadiazine - 1,1-dioxide, 6-chloro-3-[2-(3,4-dichloro-phenyl)-ethyl]-7-sulfamyl-3,4-dihydro - 2 - H - [1,2,4]-benzothiadiazine-1,1-dioxide.

*Example 22*

A mixture of 5.6 g. of 5-chloro-2,4-disulfamyl-aniline, 2.6 g. of 2-phenyl-propionaldehyde, 1 ml. of a saturated solution of hydrogen chloride in ethyl acetate and 25 ml. of diethyleneglycol is heated on the steam bath for one hour, concentrated to about one-half of the original volume, diluted with water and worked up as described in Example 21. The 6-chloro-3-(1-phenyl-ethyl-7-sulfamyl-3,4-dihydro-2-H-[1,2,4]-benzothiadiazine - 1,1 - dioxide is obtained in yellow crystals after recrystallization from aqueous ethanol, M.P. 226–228°. The melting point rises to 235–236° after repeated recrystallization.

*Example 23*

To a mixture of 7.2 g. of the 1-(2-chloro-phenyl)-2,2-diethoxy-ethane and 6.0 g. of 5-chloro-2,4-disulfamyl-aniline in 50 ml. of diethyleneglycol dimethylether is added 1 ml. of concentrated hydrochloric acid; the reaction mixture is heated for 2½ hours on the steam bath, then concentrated to about one-third of the original volume and filtered. The filtrate is poured into 200 ml. of water, the aqueous mixture is allowed to stand at room temperature and the resulting precipitate is collected and recrystallized from a mixture of ethanol and water containing a small amount of diethyleneglycol dimethylether. The first crop represents unreacted starting material; upon standing the filtrate yields the desired 6 - chloro - 3 - (2 - chloro - benzyl) - 7 - sulfamyl - 3,4-dihydro - 2 - H - [1,2,4] - benzothiadiazine - 1,1 - dioxide, M.P. 270°.

*Example 24*

A mixture of 6.4 g. of 2-(2-bromo-phenyl)-2,2-diethoxy-ethane, 4.7 g. of 5-chloro-2,4-disulfamyl-aniline, 1.65 ml. of concentrated hydrochloric acid and 30 ml. of diethyleneglycol dimethylether is heated on the steam bath for 2½ hours and then filtered. The filtrate is chilled overnight, evaporated to one-third of its volume and the resulting crystalline material is filtered off. The 3 - (2 - bromo - benzyl) - 6 - chloro - 7 - sulfamyl - 3,4-dihydro - 2 - H - [1,2,4] - benzothiadiazine - 1,1, - dioxide is recrystallized twice from a mixture of diethyleneglycol dimethylether and water, M.P. 277° (decomposition).

*Example 25*

A mixture of 8.1 g. of the crude 2-(4-chloro-phenyl)-2,2-diethoxy-ethane, 6.7 g. of 5-chloro-2,4-disulfamyl-aniline, 1.5 ml. of concentrated hydrochloric acid and 50 ml. of diethyleneglycol dimethylether, when reacted as shown in Example 24, yields the 6-chloro-3-(4-chloro-benzl) - 7 - sulfamyl - 3,4 - dihydro - 2 - H - [1,2,4]-benzothiadiazine-1,1-dioxide, which melts at 224–226° after recrystallization from water.

*Example 26*

To 100 ml. of dry diethyleneglycol dimethylether is given 0.4 g. of anhydrous aluminum chloride while cooling; this solution is warmed to 30–40° and 1.16 g. of 3 - benzyl - 6 - chloro - 7 - sulfamyl - [1,2,4] - benzothiadiazine-1,1-dioxide is added. The solution is heated to 85° and maintained at that temperature during the dropwise addition of a solution of 0.57 g. of sodium borohydride in 30 ml. of dry diethyleneglycol dimethylether. The reaction mixture is heated at 85° for one additional hour, is then cooled, diluted with 40 ml. of water and acidified with dilute aqueous hydrochloric acid. The solvent is removed under reduced pressure, the residue is triturated with water, the solid material is filtered and recrystallized from a mixture of N,N-dimethylformamide and water. The first two crops of crystalline material is identified as starting material; the mother liquors are diluted with water to yield a third crop of crystalline material, which is filtered off and washed with ethanol. It represents 3-benzyl-7-chloro-7-sulfamyl-3,4-dihydro-2-H-[1,2,4]-benzothiadiazine-1,1-dioxide, M.P. 260° (with decomposition) and is identical with the product obtained according to the procedure of Example 20.

The starting materfial may be prepared as follows: A mixture of 14.3 g. of 5-chloro-2,4-disulfamyl-aniline and 7.75 g. of phenylacetyl chloride in 60 ml. of diethyleneglycol dimethylether is heated to 90–100° for 1½ hours and then concentrated under reduced pressure. Water is added and the crystalline 5-chloro-2,4-disulfamyl-N-phenylacetyl-aniline is filtered off and recrystallized from ethanol, M.P. 229–232°.

5.0 g. of 5 - chloro - 2,4 - disulfamyl - N - phenylacetyl-aniline is heated to 220–230° under reduced pressure. After melting, the product solidifies and is recrystallized from N,N-dimethylformamide and water to yield the desired 3 - benzyl - 6 - chloro - 7 - sulfamyl - [1,2,4]-benzothiadiazine-1,1-dioxide.

By replacing in the preparation of the starting material the 5-chloro-aniline-2,4-disulfonyl chloride with 5-methyl-aniline-2,4-disulfonyl chloride, the 3-benzyl-6-methyl-7-sulfamyl-[1,2,4]-benzothiadiazine-1,1-dioxide is obtained, which can be converted to the 3-benzyl-6-methyl-7-sulfamyl - 3,4 - dihydro - 2 - H - [1,2,4] - benzothiadiazine-1,1-dioxide by treatment of an aqueous sodium hydroxide solution with sodium borohydride.

*Example 27*

A mixture of 5.7 g. of 5-chloro-2,4-disulfamyl-aniline, 2.2 g. of 3-cyclohexene carboxaldehyde and 1 ml. of ethyl acetate saturated with hydrogen chloride in 50 ml. of diethyleneglycol dimethylether is heated on the steam bath for one hour. Two-thirds of the solvent is stripped off under reduced pressure; the residue is added to water while stirring. The crystalline 6-chloro-3-(3-cyclohexenyl) - 7 - sulfamyl - 3,4 - dihydro - 2 - H - [1,2,4]-benzothiadiazine-1,1-dioxide is collected and recrystallized from methanol, M.P. 252–254°.

In the above reaction, 5-chloro-2,4-disulfamyl-aniline may be replaced by 5-bromo-2,3-disulfamyl-aniline; when reacted with 3-cyclohexene carboxaldehyde as mentioned hereinabove, these aniline derivatives yield 6 - bromo - 3 - (3 - cyclohexenyl) - 7 - sulfamyl - 3,4-dihydro-2-H-[1,2,4]-benzothiadiazine-1,1-dioxide.

*Example 28*

A mixture of 6.2 g. of cyclopentyl-diethoxy-methane (diethyl acetal of cyclopentane carboxaldehyde), 7.4 g. of 5-chloro-2,4-disulfamyl-aniline, 5 ml. of diethyleneglycol dimethylether and 2 ml. of concentrated hydrochloric acid is heated on the steam bath for two hours. Upon cooling a crystalline precipitate is formed, which is collected and washed with ethanol. The 3-cyclopentyl-6 - chloro - 7 - sulfamyl - 3,4 - dihydro - 2 - H - [1,2,4]-benzothiadiazine-1,1-dioxide melts at 271–272°.

The cyclopentyl-diethoxy-methane (diethyl acetal of cyclopentane carboxaldehyde) used as the starting material may be prepared as follows: To a mixture of 20 g. of bromocyclopentane and 3.26 g. of magnesium turnings in ether is added one crystal of iodine; the mixture is refluxed until the magnesium has disappeared and is then cooled. 15.9 g. of ethyl orthoformate is given to the Grignard reagent, the reaction mixture is refluxed for sixteen hours and is then chilled. 79.5 g. of 6 percent aqueous hydrochloric acid is added dropwise while stirring and cooling. A yellow oil separates, which is dissolved in additional ether; the organic layer is separated, washed with water and dried over sodium sulfate. The solvent is evaporated and the crude cyclopentyl-diethoxymethane (diethyl acetal of cyclopentane carboxaldehyde) is used without further purification.

Example 29

A mixture of 5.0 g. of the cyclohexyl-diethoxy-methane (diethyl acetal of cyclohexane carboxaldehyde), 5.7 g. of 5-chloro-2,4-disulfamyl-aniline, 20 ml. of diethyleneglycol dimethylether and 2 ml. of concentrated hydrochloric acid is heated at 95° for three hours. The desired 6 - chloro - 3 - cyclohexyl - 7 - sulfamyl - 3,4-dihydro - 2 - H - [1,2,4] - benzothiadiazine - 1,1 - dioxide precipitates and is collected, M.P. 278°–280°.

An aqueous solution of the sodium salt of 6-chloro-3-cyclohexyl-7-sulfamyl-3,4-dihydro - 2 - H-[1,2,4] - benzothiadiazine-1,1-dioxide may be obtained by dissolving 6-chloro-3-cyclohexyl-7-sulfamyl-3,4-dihydro-2-H-[1,2,4]-benzothiadiazine-1,1-dioxide in an equivalent amount of 2 N aqueous sodium hydroxide solution.

The starting material may be prepared as shown in Example 2, i.e. the Grignard reagent formed from bromocyclohexane and magnesium is treated with ethyl orthoformate and the desired cyclohexyl-diethoxy-methane (diethyl acetal of cyclohexane carboxaldehyde) is used without further purification.

Other compounds prepared according to the above procedure by selecting the appropriate starting materials are, for example, 6-chloro-3-cyclopropyl-7-sulfamyl-3,4-dihydro - 2 - H - [1,2,4] - benzothiadiazine-1,1-dioxide, 6-chloro - 3-cyclobutyl-7-sulfamyl-3,4-dihydro-2-H-[1,2,4]-benzothiadiazine-1,1-dioxide, 6-chloro-3-cycloheptyl-7-sulfamyl-3,4-dihydro-2-H - [1,2,4] - benzothiadiazine-1,1-dioxide, 6-chloro-3-cyclooctyl-7-sulfamyl-3,4-dihydro-2-H-[1,2,4]-benzothiadiazine-1,1-dioxide and the like.

Example 30

A mixture of 1.0 g. of cyclopentyl-acetaldehyde, 2.6 g. of 5-chloro-2,4-disulfamyl-aniline, 1 ml. of a concentrated solution of hydrogen chloride in ethyl acetate and 15 ml. of diethyleneglycol dimethylether is heated on the steam bath for 2½ to 3 hours and then allowed to stand overnight. The solution is concentrated to a small volume, the residue is poured into water while stirring and the resulting precipitate is filtered off. The 6-chloro-3-cyclopentylmethyl-7-sulfamyl-3,4-dihydro-2 - H - [1,2,4]-benzothiadiazine-1,1-dioxide is recrystallized from a mixture of ethanol and water, M.P. 230–231°.

The aldehyde used as the starting material may be prepared, for example, by converting cyclopentyl-acetic acid into its chloride and treating the latter with hydrogen in the presence of palladium on barium sulfate as a catalyst according to the Rosenmund procedure.

Other 3,4-dihydro-2-H-[1,2,4]-benzothiadiazine-1,1-dioxides, which may be manufactured according to the previously-given procedure by varying the starting materials, are 6-chloro-3-cyclopropylmethyl-7-sulfamyl-3,4-dihydro-2-H-[1,2,4]-benzothiadiazine-1,1-dioxide, 6-chloro-3 - (3 - cyclohexenylmethyl)-7-sulfamyl-3,4-dihydro-2-H-[1,2,4] - benzothiadiazine-1,1-dioxide, 6 - bromo-3-cyclopentylmethyl-7-sulfamyl-3,4-dihydro-2-H-[1,2,4] - benzothiadiazine-1,1-dioxide, 6 - chloro-3-(2-cyclohexylethyl)-7 - sulfamyl-3,4-dihydro-2-H - [1,2,4] - benzothiadiazine-1,1-dioxide and the like.

Example 31

By treating a solution of 6-chloro-3-(2-cyclopentylethyl)-7-sulfamyl-[1,2,4]-benzothiadiazine-1-,1-dioxide in diethyleneglycol dimethylether with sodium borohydride in the presence of aluminum chloride at room temperature for two hours, concentrating the solution and adding water to the residue, the 6-chloro-3-(2-cyclopentylethyl)- 7 - sulfamyl - 3,4 - dihydro-2-H-[1,2,4]-benzothiadiazine-1,1-dioxide may be obtained.

The starting material used in the above reaction may be prepared by reacting 5-chloro-aniline-2,4-disulfonyl chloride with 3-cyclopentyl-propionyl chloride, treating the resulting 5-chloro-N-(3-cyclopentylpropionyl)-aniline-2,4-disulfonyl chloride with ammonia and subsequently heating the resulting product to achieve ring closure to the desired 6 - chloro-3-(2-cyclopentyl-ethyl)-7-sulfamyl-[1,2,4]-benzothiadiazine-1,1-dioxide.

The above-described 6-chloro-3-(2-cyclopentylethyl)-7-sulfamyl-3,4-dihydro-2-H-[1,2,4]-benzothiadiazine-1,1-dioxide may also be prepared by treating 5-chloro-2,4-disulfamyl-aniline with 3-cyclopentyl-propionaldehyde or a reactive functional derivative thereof, such as an acetal or the sodium bisulfite addition compound thereof, according to the method described in Example 30.

Example 32

To a solution of 24.5 g. of the cyclopentylacetaldehyde sodium bisulfite addition compound in 170 ml. of water and 110 ml. of concentrated hydrochloric acid is added 31.2 g. of 5-chloro-2,4-disulfamyl-aniline and 250 ml. of ethanol; the mixture is refluxed for four hours on the steam bath and then filtered hot. Upon chilling, a crystalline precipitate is formed, which is filtered off and recrystallized from a mixture of ethanol and water to yield the pure 6 - chloro-3-cyclopentylmethyl-7-sulfamyl-3,4-dihydro-2-H-[1,2,4)-benzothiadiazine - 1,1 - dioxide, M.P. 238–240°. The product is identical with the compound obtained according to the process of Example 30.

The above-obtained 6 - chloro-3-cyclopentylmethyl-7-sulfamyl-3,4-dihydro-2-H - [1,2,4] - benzothiadiazine-1,1-dioxide may also be prepared, for example, by treating a solution of 6 - chloro-3-cyclopentylmethyl-7-sulfamyl-[1,2,4] - benzothiadiazine-1,1-dioxide (prepared from 5-chloro-aniline-2,4-disulfonyl chloride, by reacting the latter with cyclopentyl-acetyl chloride and treating the resulting 5-chloro-N-cyclopentylacetyl-aniline-2,4-disulfonyl chloride with ammonia to form the sulfamyl derivative with simultaneous ring closure) in diethyleneglycol dimethylether with sodium borohydride in the presence of aluminum chloride.

Generally, 6 - chloro-3-cyclopentylmethyl-7-sulfamyl-3,4 - dihydro - 2-H-[1,2,4]-benzothiadiazine-1,1-dioxide or an alkali metal salt thereof may be prepared by reacting 5-chloro-2,4-disulfamyl-aniline with cyclopentyl-acetaldehyde or a reactive functional derivative thereof, such as an acetal thereof, e.g. dimethyl acetal, diethyl acetal and the like, or the sodium bisulfite addition compound thereof, or reducing in 6-chloro-3-cyclopentylmethyl-7-sulfamyl-[1,2,4]-benzothiadiazine - 1,1 - dioxide the C=N— double bond in the heterocyclic portion of the 1,2,4-benzothiadiazine-1,1-dioxide nucleus, and if desired, converting a resulting salt into the free compound, and/or, if desired, converting the free compound into a salt thereof. These reactions are carried out according to the previously-described procedures.

Example 33

A mixture of 2.5 g. of cyclohexyl-acetaldehyde, 5.8 g. of 5-chloro-2,4-disulfamyl-aniline, 50 ml. of diethyleneglycol dimethylether and 3 ml. of a saturated solution of hydrogen chloride in ethyl acetate is heated on the steam bath for three hours. The solution is evaporated to a small volume, the residue is poured into water, triturated and allowed to stand for several hours. The crystalline material is filtered off and recrystallized from a 9:1 mixture of ethanol and water to yield the 6-chloro-3-cyclohexylmethyl-7-sulfamyl-3,4-dihydro-2 - H - [1,2,4] - benzothiadiazine-1,1-dioxide, M.P. 224–226°; yield: 6.0 g.

The aldehyde used in the above preparation can be prepared according to the Rosenmund procedure as follows: A slow stream of hydrogen is passed through a mixture of 2.0 g. of palladium on barium sulfate (containing 5 percent palladium), 0.5 ml. of a solution of quinoline and sulfur in xylene (prepared by refluxing 8.5 g. of freshly distilled quinoline and 1.4 g. of sulfur for five hours, and diluting the mixture with xylene to a total volume of 99 ml.), and 125 ml. of xylene; about 10 ml. of the solvent is distilled off to remove any trace of water. 19.3 g. of cyclohexyl-acetic acid chloride is added; the reaction mixture is heated by keeping a bath temperature of 190–195°, and a slow stream of hydrogen is passed through the mixture while stirring. The evolved hydrogen chloride is collected and titrated at intervals to determine the end point of the reduction. Treatment with hydrogen is terminated after 11½ hours (90 percent of the theoretical amount of hydrogen chloride has been generated), the reaction mixture is cooled, the catalyst is filtered off and the filtrate is diluted with 300 ml. of diethyl ether. The organic solution is diluted with 400 ml. of saturated aqueous sodium bisulfite and stirred for seventeen hours. The solid sodium bisulfite addition compound of the cyclohexyl-acetaldehyde is filtered off and washed with diethyl ether, yield: 28 g. The solid material is stirred with 30 ml. of a 20 percent aqueous solution of sodium carbonate until it dissolves. The organic material is extracted with diethyl ether, the organic layer is dried and evaporated to give 3.0 g. of crude cyclohexylacetaldehyde.

The following compounds may also be prepared according to the above methods (e.g. Examples 27–33) by selecting the appropriate starting materials, whereby the aldehydes may be used as such or in the form of reactive derivatives, i.e. acetals, e.g. dimethyl acetal, diethyl acetal and the like, or sodium bisulfite addition compounds:

6-chloro-3-(1-cyclopentylethyl)-7-sulfamyl-3,4-dihydro-2-H-[1,2,4]-benzothiadiazine-1,1-dioxide,
6-chloro-3-cyclobutylmethyl-7-sulfamyl-3,4-dihydro-2-H-[1,2,4]-benzothiadiazine-1,1-dioxide,
6-chloro-3-(1-cyclobutylethyl)-7-sulfamyl-3,4-dihydro-2-H-[1,2,4]-benzothiadiazine-1,1-dioxide,
6-chloro-3-(2-cyclopentenylmethyl)-7-sulfamyl-3,4-dihydro-2-H-[1,2,4]-benzothiazine-1,1-dioxide,
6-chloro-3-[2-(1-cyclopentenyl)-ethyl]-7-sulfamyl-3,4-dihydro-2-H-[1,2,4]-benzothiadiazine-1,1-dioxide,
6-chloro-3-[1-(2-cyclopentenyl)-ethyl]-7-sulfamyl-3,4-dihydro-2-H-[1,2,4]-benzothiadiazine-1,1-dioxide,
6-chloro-3-(1-cyclohexylethyl)-7-sulfamyl-3,4-dihydro-2-H-[1,2,4]-benzothiadiazine-1,1-dioxide,
6-chloro-3-(1-cyclohexylethyl)-7-sulfamyl-3,4-dihydro-2-H-[1,2,4]-benzothiadiazine-1,1-dioxide,
6-chloro-3-[(3-cyclohexenyl)-ethyl]-3,4-dihydro-2-H-[1,2,4]-benzothiadiazine-1,1-dioxide,
6-chloro-3-cycloheptylmethyl-7-sulfamyl-3,4-dihydro-2-H-[1,2,4]-benzothiadiazine-1,1-dioxide,
6-chloro-3-cycloheptylmethyl-7-sulfamyl-3,4-dihydro-2-H-[1,2,4]-benzothiadiazine-1,1-dioxide,
6-chloro-3-(2-cycloheptenylmethyl)-7-sulfamyl-3,4-dihydro-2-H-[1,2,4]-benzothiadiazine-1,1-dioxide,
6-chloro-3-cyclo-octylmethyl-7-sulfamyl-3,4-dihydro-2-H-[1,2,4]-benzothiadiazine-1,1-dioxide and the like.

In the above-described compounds with carbocyclic alicyclic hydrocarbon radicals containing double bonds in the 3-position, the latter may be converted into saturated carbocyclic alicyclic hydrocarbon radicals by reduction. The reduction may be achieved, for example, by treatment of a liquid ammonia solution of the compound containing an unsaturated carbocyclic alicyclic hydrocarbon radical with an alkali metal, particularly lithium and the like. Catalytic reduction may also be used, but care had to be taken that the carbocyclic aryl portion of the benzothiazine ring system or any other groups, e.g. halogen and the like, are not affected; treatment with hydrogen in the presence of Raney nickel, using a lower alkanol, e.g. ethanol and the like, as a solvent, may be feasible.

*Example 34*

The new 3,4-dihydro-2-H-[1,2,4]-benzothiadiazine-1,1-dioxide compounds of this invention may be made up into pharmaceutical compositions. For example, the 6-chloro-7-sulfamyl-3,4-dihydro - 2 - H-[1,2,4]-benzothiadiazine-1,1-dioxide may be formulated into capsules containing 0.05 g. of active material according to the following procedure (for 1000 capsules).

| Ingredients: | G. |
|---|---|
| 6-chloro-7-sulfamyl-3,4-dihydro-2-H-[1,2,4]-benzothiadiazine-1,1-dioxide | 50.00 |
| Corn starch | 17.50 |
| Magnesium stearate | 3.50 |
| Lactose spray dried | 279.00 |

The ingredients are sifted through a 20 mesh screen and then mixed together for twenty minutes. Each capsule (No. 2, hard gelatine) is filled with 0.35 g. of the mix by using a capsule filling machine.

Tablets, each containing 0.05 g. of 6-chloro-7-sulfamyl-3,4-dihydro-2-H-[1,2,4]-benzothiadiazine - 1,1 - dioxide, may be prepared according to the following procedure (for 1000 tablets).

| Ingredients: | G. |
|---|---|
| 6 - chloro-7-sulfamyl-3,4-dihydro-2H-[1,2,4]-benzothiadiazine-1,1-dioxide | 50.00 |
| Lactose spray dried | 124.00 |
| Polyethylene glycol 6000 | 8.00 |
| Tragacanth BC, U.S.P. | 4.00 |
| Sucrose, U.S.P. | 3.00 |
| Talc, U.S.P. | 10.00 |
| Magnesium stearate | 1.00 |
| Distilled water and 3A alcohol, q.s. | |

6-chloro-7-sulfamyl-3,4-dihydro-2-H-[1,2,4]-benzothiadiazine-1,1-dioxide, tragacanth, lactose, sucrose, talc and magnesium stearate are screened through a 20 mesh sieve and mixed together for twenty minutes. The polyethyleneglycol is dissolved in a mixture of 15 ml. of water and 15 ml. of alcohol. The mixed powders are wetted with this solution; the moist mass is passed through a 10 mesh screen and then dried at 38° with circulating air until moisture content is from about two to about three percent. The granules are broken on a 16 mesh sieve and compressed into tablets of 0.20 g. weight by using 10/32" punches and dies.

What is claimed is:

1. A member selected from the group consisting of a 3,4 - dihydro-2-H-[1,2,4]-benzothiadiazine-1,1-dioxide of the formula.

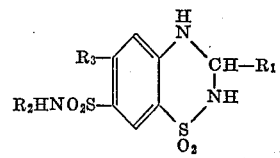

in which $R_1$ is a member selected from the group consisting of hydrogen, lower aliphatic hydrocarbon, halogen-substituted lower aliphatic hydrocarbon, lower alkoxy substituted lower aliphatic hydrocarbon, monocyclic carbocyclic aryl, bicyclic carbocyclic aryl, monocyclic carbocyclic aryl-lower alkyl, bicyclic carbocyclic aryl-lower alkyl, and said aryl substituents substituted by a member selected from the group consisting of halogen, lower alkyl, hydroxy, lower alkoxy, lower alkyl-mercapto, sulfamyl and di-lower alkyl amino, furyl, thenyl, thienyl and pyridyl, $R_2$ is a member selected from the group consisting of hydrogen and lower alkyl and $R_3$ is a member selected from the group consisting of halogen, lower alkyl, amino, nitro and lower alkoxy, and a therapeutically useful alkali metal salt thereof.

2. 6 - $R_3$-7-sulfamyl-3,4-dihydro-2-H[1,2,4]-benzothiadiazine-1,1-dioxide, in which $R_3$ stands for halogen.

3. 6-chloro-7-sulfamyl-3,4-dihydro-2-H-[1,2,4]-benzothiadiazine-1,1-dioxide.

4. A therapeutically useful alkali metal salt of 6-chloro-7 - sulfamyl-3,4-dihydro-2-H[1,2,4]-benzothiadiazine-1,1-dioxide.

5. 3 - $R_1$ - 6 - $R_3$-7-sulfamyl-3,4-dihydro-2-H-[1,2,4]-benzothiadiazine-1,1-dioxide, in which $R_1$ stands for lower alkyl and $R_3$ for halogen.

6. A compound of the formula

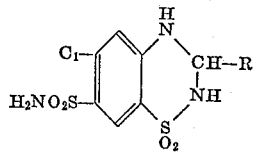

wherein R is at most bicyclic hydrocarbon.

7. 6 - chloro - 3-methyl-7-sulfamyl-3,4-dihydro-2-H-[1,2,4]-benzothiadiazine-1,1-dioxide.

8. 6 - chloro - 3 - ethyl-7-sulfamyl-3,4-dihydro-2-H-[1,2,4]-benzothiadiazine-1,1-dioxide.

9. 6 - chloro - 3-isobutyl-7-sulfamyl-3,4,-dihydro-2-H-[1,2,4]-benzothiadiazine-1,1-dioxide.

10. 3 - $R_1$ - 6-$R_3$-7-sulfamyl-3,4-dihydro-2-H-[1,2,4]-benzothiadiazine-1,1-dioxide, in which $R_1$ is halogeno-lower alkyl and $R_3$ is halogen.

11. A compound of claim 10, in which $R_1$ is chloro-substituted methyl and $R_3$ is chloro.

12. 3 - chloromethyl-6-chloro-7-sulfamyl-3,4,-dihydro-2-H-[1,2,4]-benzothiadiazine-1,1-dioxide.

13. A compound of the formula

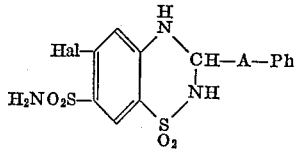

in which Hal is halogen, A is lower alkylene and Ph is a member selected from the group consisting of phenyl, lower alkyl-substituted phenyl, lower alkoxy-substituted phenyl and halogeno-phenyl.

14. 3 - benzyl-6-halogeno-7-sulfamyl-3,4-dihydro-2-H-[1,2,4]-benzothiadiazine-1,1-dioxide.

15. 3 - benzyl - 6-chloro-7-sulfamyl-3,4-dihydro-2-H-[1,2,4]-benzothiadiazine-1,1-dioxide.

16. A compound of the formula

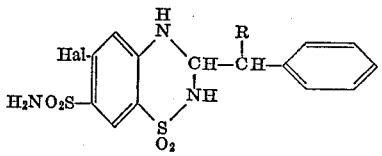

in which R is lower alkyl and Hal is halogen.

17. 6 - chloro - 3 - (1 - phenylethyl) - 7 - sulfamyl - 3,4-dihydro-2-H-[1,2,4]-benzothiadiazine-1,1-dioxide.

18. 6 - halogeno - 3 - (2 - phenylethyl) - 7 - sulfamyl-3,4-dihydro-2-H-[1,2,4]-benzothiadiazine-1,1-dioxide.

19. 6 - chloro - 3 - (2 - phenylethyl) - 7 - sulfamyl - 3,4-dihydro-2-H-[1,2,4]-benzothiadiazine-1,1-dioxide.

20. 3 - $R_1$ - 6 - $R_3$ - 7 - sulfamyl - 3,4 - dihydro - 2 - H - [1,2,4]-benzthiadiazine-1,1-dioxide, in which $R_1$ is cycloalkyl having from three to eight ring carbon atoms and $R_3$ is halogen.

21. 6 - chloro - 3 - cyclohexyl - 7 - sulfamyl - 3,4 - dihydro-2-H-[1,2,4]-benzothiadiazine-1,1-dioxide.

22. 3 - $R_1$ - 6 - $R_3$ - 7 - sulfamyl - 3,4 - dihydro - 2 - H-[1,2,4]-benzothiadiazine-1,1-dioxide, in which $R_1$ is cycloalkenyl having from four to eight ring carbon atoms, and $R_3$ is halogen.

23. 6 - chloro - 3 - (2 - cyclopentenyl) - 7 - sulfamyl-3,4-dihydro-2-H-[1,2,4]-benzothiadiazine-1,1-dioxide.

24. 6 - chloro - 3 - (3 - cyclohexenyl) - 7 - sulfamyl-3,4-dihydro-2-H-[1,2,4]-benzothiadiazine-1,1-dioxide.

25. 3 - $R_1$ - 6 - $R_3$ - 7 - sulfamyl - 3,4 - dihydro - 2 - H-[1,2,4]-benzothiadiazine-1,1-dioxide, in which $R_1$ is cycloalkyl-lower alkyl, in which cycloalkyl has from three to eight ring carbon atoms and lower alkyl has from one to four carbon atoms, and $R_3$ is halogen.

26. 6-chloro-3-cycloalkyl-lower alkyl-7-sulfamyl-3,4-dihydro-2-H-[1,2,4]-benzothiadiazine-1,1,-dioxide, in which cycloalkyl has from five to six ring carbon atoms and lower alkyl has from one to two carbon atoms.

27. 6 - chloro - 3 - cyclopentylmethyl - 7 - sulfamyl-3,4-dihydro-2-H-[1,2,4]-benzothiadiazine-1,1-dioxide.

28. 6 - chloro - 3 - (1 - cyclopentylethyl) - 7 - sulfamyl-3,4-dihydro-2-H-[1,2,4]-benzothiadiazine-1,1-dioxide.

29. 6 - chloro - 3 - (2 - cyclopentylethyl) - 7 - sulfamyl-3,4-dihydro-2-H-[1,2,4]-benzothiadiazine-1,1-dioxide.

30. 6 - chloro - 3 - cyclohexylmethyl - 7 - sulfamyl - 3,4-dihydro-2-H-[1,2,4]-benzothiadiazine-1,1-dioxide.

31. 3 - $R_1$ - 6 - $R_3$ - 7 - sulfamyl - 3,4 - dihydro - 2 - H-[1,2,4]-benzothiadiazine-1,1-dioxide, in which $R_1$ is cycloalkenyl-lower alkyl, in which cycloalkenyl has from four to eight ring carbon atoms, and lower alkyl has from one to four carbon atoms, and $R_3$ is halogen.

32. 6 - chloro - 3 - (2 - cyclopentylmethyl) - 7 - sulfamyl-3,4 - dihydro - 2 - H - [1,2,4] - benzothiadiazine-1,1-dioxide.

33. 6 - chloro - 3 - [2 - (1 - cyclopentenyl) - ethyl] - 7-sulfamyl - 3,4 - dihydro - 2 - H - [1,2,4] - benzothiadiazine-1,1-dioxide.

34. 4 - $R_2''$ - 6 - $R_3$ - sulfamyl - 3,4 - dihydro - 2 - H-[1,2,4]-benzothiadiazine-1,1-dioxide, in which $R_2''$ is lower alkyl and $R_3$ represents halogen.

35. 6 - lower alkyl-7-sulfamyl-3,4-dihydro-2-H-[1,2,4]-benzothiadiazine-1,1-dioxide said lower alkyl substituent having at most two carbon atoms.

36. 6-chloro-3-(thienyl-lower alkyl)-7-sulfamyl-3,4-dihydro-[1,2,4]-benzothiadiazine-1,1-dioxide.

37. 6 - chloro - 3 - thenyl - 7 - sulfamyl - 3,4 - dihydro-[1,2,4]-benzothiadiazine-1,1-dioxide.

38. The process for the preparation of a 3,4-dihydro-2-H-[1,2,4]-benzothiadiazine-1,1-dioxide compound of the formula

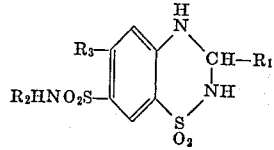

which comprises treating (a) a compound of the formula

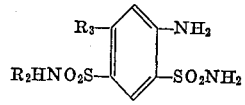

with (b) a member selected from the group consisting of an aldehyde of the formula $R_1$—CHO and an acetal thereof, in which $R_1$ is a member selected from the group consisting of lower aliphatic hydrocarbon, halogen-substituted lower aliphatic hydrocarbon, lower alkoxy substituted lower aliphatic hydrocarbon, monocyclic carbocyclic aryl, bicyclic carbocyclic aryl, monocyclic carbocyclic aryl-lower alkyl, bicyclic carbocyclic aryl-lower alkyl, and said aryl substituents substituted by a member selected from the group consisting of halogen, lower alkyl, hydroxy, lower alkoxy, lower alkyl-mercapto, sulfamyl and di-lower alkyl amino, furyl, thenyl, thienyl and pyridyl, $R_2$ is a member selected from the group consisting of hydrogen and lower alkyl and $R_3$ is a member selected from the group consisting of halogen, lower alkyl, nitro and lower alkoxy.

39. A process according to claim 36, wherein the aldehyde is formaldehyde.

40. The process for the preparation of 3,4-dihydro-2-H-[1,2,4]-benzothiadiazine-1,1-dioxide, which comprises treating (a) 5-chloro-2,4-disulfamyl-aniline with (b) a member selected from the group consisting of formaldehyde, paraformaldehyde and trioxane, said reactants (a) and (b) being employed in about stoichiometric amounts.

41. The process for the preparation of 3,4-dihydro-2-H-[1,2,4]-benzothiadiazine-1,1,-dioxide, which comprises treating (a) 5-chloro-2,4-disulfamyl-aniline with (b) an acetal of formaldehyde, said reactants (a) and (b) being employed in about stoichiometric amounts.

42. 6-chloro-3-lower aliphatic hydrocarbon-7-sulfamyl-3,4-dihydro-2-H-[1,2,4]-benzothiadiazine-1,1-dioxide.

43. A compound of claim 16 wherein Hal is chlorine.

No references cited.

NICHOLAS S. RIZZO, *Primary Examiner.*

UNITED STATES PATENT OFFICE
CERTIFICATE OF CORRECTION

Patent No. 3,163,645                      December 29, 1964

George de Stevens et al.

It is hereby certified that error appears in the above numbered patent requiring correction and that the said Letters Patent should read as corrected below.

Column 3, line 13, for "akyl" read -- alkyl --; line 45, for "alkyl-substituted" read -- alkyl mercapto-substituted --; column 3, lines 45 and 46, for "-trifluoromethyl mercapto-phenol" read -- -methylmercapto-phenol --; lines 49 and 50, for "and like" read -- and the like --; column 7, line 27, for "-H[1,2,4]-" read -- -H-[1,2,4]- --; column 8, lines 53 and 54, for "benzothiodiazine" read -- benzothiadiazine --; line 61, for "benzothiadizine" read -- benzothiadiazine --; column 11, line 15, after "treating" insert -- an --; line 27, for "3.4-dihydro-2-H[1,2,4]-" read -- 3,4-dihydro-2-H-[1,2,4]- --; same column 11, lines 68 and 69, for "-diethoxy-methane," read -- -diethoxy-methane), --; column 12, line 2, after "example" insert a comma; line 20, for "tratement" read -- treatment --; column 15, line 35, after "of", second occurrence, insert -- a --; line 41, for "equeous" read -- aqueous --; same column 15, line 65, for "2-4-" read -- 2,4- --; column 20, line 24, for "materfial" read -- material --; column 22, line 6, for "-1-,1-" read -- -1,1- --; line 39, for "-[1,2,4)-" read -- -[1,2,4]- --; column 23, line 51, for "benzothiazine" read -- benzothiadiazine --; line 53, for "-1,1,-" read -- -1,1- --; column 24, line 6, for "benzothiazine" read -- benzothiadiazine --; line 36, for "-2H-" read -- -2-H- --; line 61, after "formula" strike out the period; lines 70 and 71, for "substitiuted" read -- substituted --; column 25, line 13, for "-H[1,2,4]-" read -- -H-[1,2,4]- --; column 25, lines 19 to 24, the left-hand portion of the formula should appear as shown below instead of as in the patent:

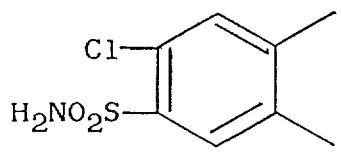

3,163,645 same column 25, line 30, for "-3,4,-" read -- -3,4- --; line 71, for "benzthiadiazine" read -- benzothiadiazine --; column 26, line 15, for "-1,1,-" read -- -1,1- --; line 31, for "(2-cyclopentylmethyl)-" read -- (2-cyclopentenylmethyl)- --; column 27, line 4, for the claim reference numeral "36" read -- 38 --.

Signed and sealed this 23rd day of March 1965.

(SEAL)
Attest:

ERNEST W. SWIDER
Attesting Officer

EDWARD J. BRENNER
Commissioner of Patents